United States Patent
Pullen et al.

(10) Patent No.: US 10,270,342 B2
(45) Date of Patent: Apr. 23, 2019

(54) ERROR CORRECTION FOR AVERAGE CURRENT SENSING IN A SWITCHING REGULATOR

(71) Applicant: QUALCOMM Incorporated, San Diego, CA (US)

(72) Inventors: Stuart Pullen, Raleigh, NC (US); Michael Bui, San Diego, CA (US); Chunping Song, Sunnyvale, CA (US); Jialei Xu, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/973,787

(22) Filed: May 8, 2018

(65) Prior Publication Data

US 2018/0331624 A1 Nov. 15, 2018

Related U.S. Application Data

(60) Provisional application No. 62/505,791, filed on May 12, 2017.

(51) Int. Cl.
*H02M 3/156* (2006.01)
*H02M 3/158* (2006.01)
*H02M 1/088* (2006.01)
*H02M 1/00* (2006.01)

(52) U.S. Cl.
CPC ........... *H02M 3/158* (2013.01); *H02M 1/088* (2013.01); *H02M 2001/0009* (2013.01)

(58) Field of Classification Search
CPC ...................... H02M 3/158; H02M 2001/0009
See application file for complete search history.

(56) References Cited

U.S. PATENT DOCUMENTS

| 9,887,625 B2 | 2/2018 | Ozawa |
| 2005/0007087 A1* | 1/2005 | Pullen ................... H02M 3/156 323/283 |
| 2012/0229107 A1 | 9/2012 | Chen et al. |
| 2017/0324331 A1 | 11/2017 | Zhang et al. |
| 2018/0048235 A1 | 2/2018 | Karlsson et al. |

FOREIGN PATENT DOCUMENTS

WO    WO-2017137996 A1    8/2017

* cited by examiner

*Primary Examiner* — Adolf D Berhane
*Assistant Examiner* — Afework S Demisse
(74) *Attorney, Agent, or Firm* — Patterson & Sheridan, L.L.P.

(57) ABSTRACT

Certain aspects of the present disclosure provide methods and apparatus for current sensing and error correction, or at least adjustment, for a switching regulator. One example current-sensing circuit generally includes a first amplifier, a buffer, a low-pass filter, a first switch coupled between an output of the first amplifier and an input of the buffer, a second switch coupled between the output of the first amplifier and an input of the low-pass filter, a third switch coupled between an output of the buffer and the input of the low-pass filter, and a fourth switch coupled between the input of the low-pass filter and a reference node for the circuit.

30 Claims, 17 Drawing Sheets

ERROR CORRECTION FOR AVERAGE CURRENT SENSING IN A SWITCHING REGULATOR

CLAIM OF PRIORITY UNDER 35 U.S.C. § 119

The present application claims the benefit of U.S. Provisional Patent Application Ser. No. 62/505,791, filed May 12, 2017 and entitled "Slew Rate Error Correction for High Side Average Current Sensing in a Switching Regulator," which is herein incorporated by reference in its entirety

TECHNICAL FIELD

Certain aspects of the present disclosure generally relate to power electronic circuits and, more particularly, to switching regulators, such as buck converters.

BACKGROUND

A voltage regulator ideally provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A switching regulator may be implemented by a switched-mode power supply (SMPS), such as a buck converter.

Power management integrated circuits (power management ICs or PMICs) are used for managing the power requirement of a host system and may include and/or control one or more voltage regulators. A PMIC may be used in battery-operated devices, such as mobile phones, tablets, laptops, wearables, etc., to control the flow and direction of electrical power in the devices. The PMIC may perform a variety of functions for the device such as DC-to-DC conversion, battery charging, power-source selection, voltage scaling, power sequencing, etc.

SUMMARY

Aspects of the present disclosure generally relate to systems and methods for accurately sensing average input current in buck converters.

Certain aspects of the present disclosure provide a circuit for current sensing and correction in a buck converter. The circuit generally includes a first amplifier, a buffer, a low-pass filter, a first switch coupled between an output of the first amplifier and an input of the buffer, a second switch coupled between the output of the first amplifier and an input of the low-pass filter, a third switch coupled between an output of the buffer and the input of the low-pass filter, and a fourth switch coupled between the input of the low-pass filter and a reference node for the circuit.

Certain aspects of the present disclosure provide a method for current sensing and correction in a buck converter composed of a high-side transistor coupled to a low-side transistor. The method generally includes activating the high-side transistor at an activation time; sensing a high-side current with a first amplifier while the high-side transistor is activated; closing a first switch coupled between an output of the first amplifier and an input of a buffer, during a first interval associated with the high-side transistor after the activation time; and closing a second switch coupled between the output of the first amplifier and an input of a low-pass filter, after the activation time, a third switch coupled between an output of the buffer and the input of the low-pass filter being configured to be open while the second switch is closed.

Certain aspects of the present disclosure provide an apparatus for current sensing and correction for a buck converter composed of a high-side transistor coupled to a low-side transistor. The apparatus generally includes means for activating the high-side transistor at an activation time; means for sensing a high-side current while the high-side transistor is activated; means for selectively coupling an output of the means for sensing to an input of a buffer, during a first interval associated with the high-side transistor after the activation time; means for selectively coupling the output of the means for sensing to an input of a low-pass filter, after the activation time; and means for selectively coupling an output of the buffer to the input of the low-pass filter.

Certain aspects of the present disclosure provide a method for current sensing and correction in a buck converter composed of a high-side transistor coupled to a low-side transistor. The method generally includes activating the high-side transistor; sensing a current through the high-side transistor while activated; determining current information missed during the sensing after the activation; deactivating the high-side transistor; and adjusting the sensed current based on the missing current information while the high-side transistor is deactivated.

Certain aspects of the present disclosure provide an apparatus for current sensing and correction for a buck converter composed of a high-side transistor coupled to a low-side transistor. The apparatus generally includes means for activating the high-side transistor; means for sensing a current through the high-side transistor while activated; means for determining current information missed during the sensing after the activation; means for deactivating the high-side transistor; and means for adjusting the sensed current based on the missing current information while the high-side transistor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Like reference numbers and designations in the various drawings indicate like elements.

DETAILED DESCRIPTION

Figure 1:
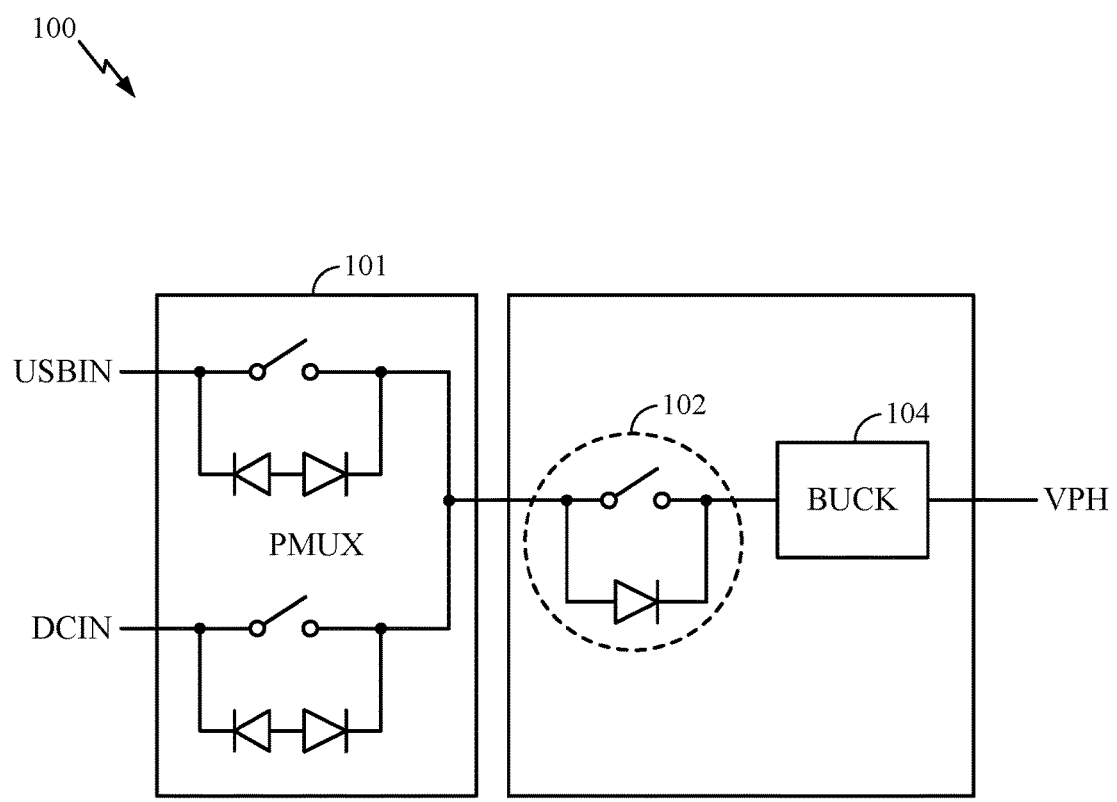
FIG. 1 is a block diagram of an example circuit for providing power to a device via an adapter, the circuit including a front porch field-effect transistor (FPFET) for sensing average input current.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

EXAMPLE CURRENT SENSING AND ERROR CORRECTION

Battery chargers may desire an accurate measurement of average input current to work with different adapters without collapsing the input voltage. One approach to sensing average input current includes adding a front porch field-effect transistor (FPFET) to sense the current between the adapter and the buck converter. However, this consumes valuable die area, uses additional die pins, and hurts efficiency. For example, sensing the current through the high-side field-effect transistor (HSFET) of the buck converter is susceptible to switching noise and slew rate errors due to the finite bandwidths of the sensing amplifier. Furthermore, the use of an overvoltage protection integrated circuit (OVPIC) or power multiplexer (PMUX) makes the FPFET redundant.

Certain aspects of the present disclosure are directed to systems and methods for sensing average input current in battery chargers and buck converters desirous of accurate and lossless sensing. In general, the current-sensing circuit with error correction described herein samples and holds the inductor current after a high-side current-sensing amplifier has had time to turn on and catch up with the inductor current. Based on the sampled current, the circuit applies a correction to the sensed current during the off time of the HSFET. In some aspects, accuracy of the current sensing may be increased by adjusting the correction based on duty cycle, load current, and/or operational mode. In some aspects, the circuit may include a low-side current-sensing amplifier (e.g., LS Isense) for even more accurate current sensing.

The current-sensing circuit with error correction described herein has advantages over traditional current-sensing schemes for switching regulators. For example, the circuit provides a lossless and accurate solution (e.g., around ±5% at moderate to high average input currents) to sense current. The circuit is also immune to switching noise. When the HSFET turns on, the input voltage to the buck converter (at the switch node that connects the two buck converter FETs to the inductor) exhibits significant voltage overshoots and ringing caused, for example, by parasitic inductances and capacitances in the circuit layout. This switching noise may be dealt with, according to certain aspects described herein, by blanking for a longer time and then correcting for the missing current information. Furthermore, the circuit described herein may include only one current-sensing amplifier for peak current limiting, regulation ramping, and input current limiting, which results in numerous benefits. First, only one trim may be involved, which helps to reduce test time during production testing. Second, the use of only one current-sensing amplifier also saves valuable die area, eliminating the area and cost associated with a front porch FET (FPFET) and a control circuit to drive and sense the FPFET. Lastly, less circuitry results in a low chip quiescent current.

Various implementations will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

FIG. 1 is a block diagram depicting an example circuit 100 for providing power to a device, the circuit including a front porch field-effect transistor (FPFET) 102 for sensing average input current. The circuit 100 includes a two-input adapter 101, the FPFET 102, and a buck converter 104. The adapter 101 includes a Universal Serial Bus (USB) input labeled "USBIN," a direct-current (DC) input labeled "DCIN," and a power multiplexer (PMUX) output. The PMUX output connects to the input of the FPFET 102, and the output of the FPFET connects to the input of the buck converter 104. The FPFET 102 may be utilized to sense the average input current from the adapter 101. Comprising a high-side FET and a low-side FET, the buck converter 104 is used to regulate the input voltage received via the FPFET 102, and the regulated output voltage (labeled "VPH") of the buck converter may be used to power internal components of a device and/or to charge a battery of the device.

Figure 2:
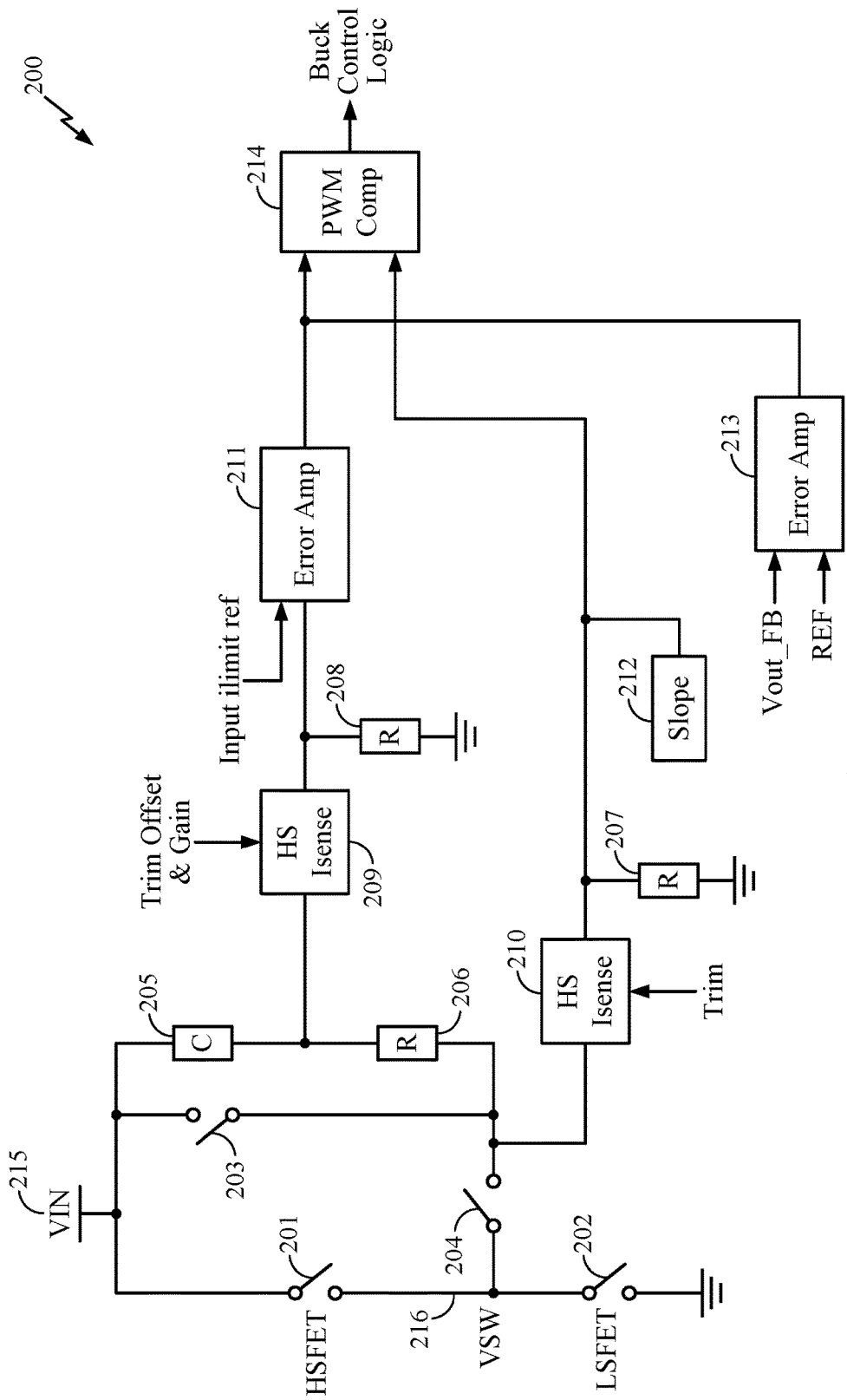
FIG. 2 is a block diagram of an example circuit for sensing average input current through a high-side FET of a buck converter, in accordance with the prior art.

FIG. 2 is a block diagram of an example circuit 200 for sensing average input current through a high-side FET (HSFET) 201 of a buck converter. The buck converter also includes a low-side FET (LSFET) 202 and an inductor (not shown) coupled to the HSFET 201 at a switch node 216 having a switch node voltage (labeled "VSW"). Although the HSFET 201 and LSFET 202 are represented by switches in FIG. 2, a person having ordinary skill in the art will understand that this is intended to illustrate transistors effectively functioning as switches.

The circuit 200 includes two switches 203, 204; a capacitor 205; three resistors 206, 207, 208; two high-side current-sensing amplifiers 209, 210 (labeled "HS Isense"); two error amplifiers 211, 213 (labeled "Error Amp"); a slope generator 212; a pulse-width modulation (PWM) comparator 214; and first and second combiners (not shown). An input voltage node 215 (labeled "VIN") is coupled to a first terminal of the HSFET 201, a first terminal of switch 203, and a first terminal of capacitor 205. A second terminal of capacitor 205 connects to a first terminal of resistor 206. A second terminal of the HSFET 201 connects to a first terminal of switch 204 and a first terminal of the LSFET 202, whose second terminal connects to a reference potential node for the buck converter and the circuit 200 (e.g., electrical ground). A second terminal of switch 203 connects to a second terminal of switch 204, a second terminal of resistor 206, and an input terminal of HS Isense 210, whose output terminal connects to a first terminal of resistor 207 and to a second input terminal of the PWM comparator 214. An output terminal of the slope generator 212 also connects to the second input terminal of the PWM comparator 214. The second terminal of capacitor 205 and the first terminal of resistor 206 connect to an input terminal of HS Isense 209, whose output terminal connects to a first terminal of resistor 208 and a second input terminal of Error Amp 211. A second terminal of resistor 208 connects to ground, causing an average voltage on the first terminal of resistor 208 to be proportional to the average input current of the buck converter. An input current limit reference node (labeled "Input ilimit ref") connects to a first input terminal of Error Amp 211, whose output terminal connects to a first input terminal of the PWM comparator 214. A feedback output voltage (labeled "Vout_FB") of the buck converter connects to a first input terminal of Error Amp 213, and an input current limit reference node (labeled "REF") connects to a second input terminal of Error Amp 213, whose output terminal connects to the first input terminal of the PWM comparator 214. Although not shown, the output terminal of the PWM comparator 214 may connect to control logic of the buck converter (e.g., for controlling duty cycles of the HSFET 201 and LSFET 202 to adjust the output voltage of the buck converter).

Placing the sampling switches (e.g., switches 203, 204) before HS Isense 209 has the advantage of limiting the slew rate error. However, the sample timing of the sampling switches and the ringing on VSW and VIN, if asymmetric, may be of concern. Each HS Isense 209, 210 may occupy a relatively large area and may involve trimming to adjust the amplifier's offset and/or gain, which takes time and can thus add additional cost.

The circuit 200 has been used in many applications and has been successfully implemented for lower voltage products. In higher voltage products that entail level shifting to drive HSFET 201, the timing of switches 203 and 204 is critical. For example, HSFET 201 may be turned on slowly to minimize, or at least reduce, switching noise and reverse diode recovery losses. If switches 203 and 204 are turned on too soon, large errors can result because the capacitor 205 will sample VSW before HSFET 201 is fully turned on. If switches 203 and 204 are turned on too late, the sampled current may be smaller than the actual current. VSW and VIN exhibit significant voltage ringing that may last for up to 50 ns after HSFET 201 turns on, and if switches 203 and 204 are on during this time, this voltage ringing can introduce errors. Thus, the timing of switches 203 and 204 is problematic. If switches 203 and 204 are delayed in turning on until the ringing subsides, then switching noise will not be an issue, but the sampled current will be too small. If switches 203 and 204 are turned on with HSFET 201, then the voltage ringing will create errors. Despite these issues, the circuit 200 often performs better than not using the capacitor 205 and the resistor 206 to sample the current. HS Isense 209 may have slew rate limitations that do not allow HS Isense to follow the high-side switch current accurately. This slew rate error can be very large, especially at high switching frequencies with short HSFET on-times.

Figure 3:
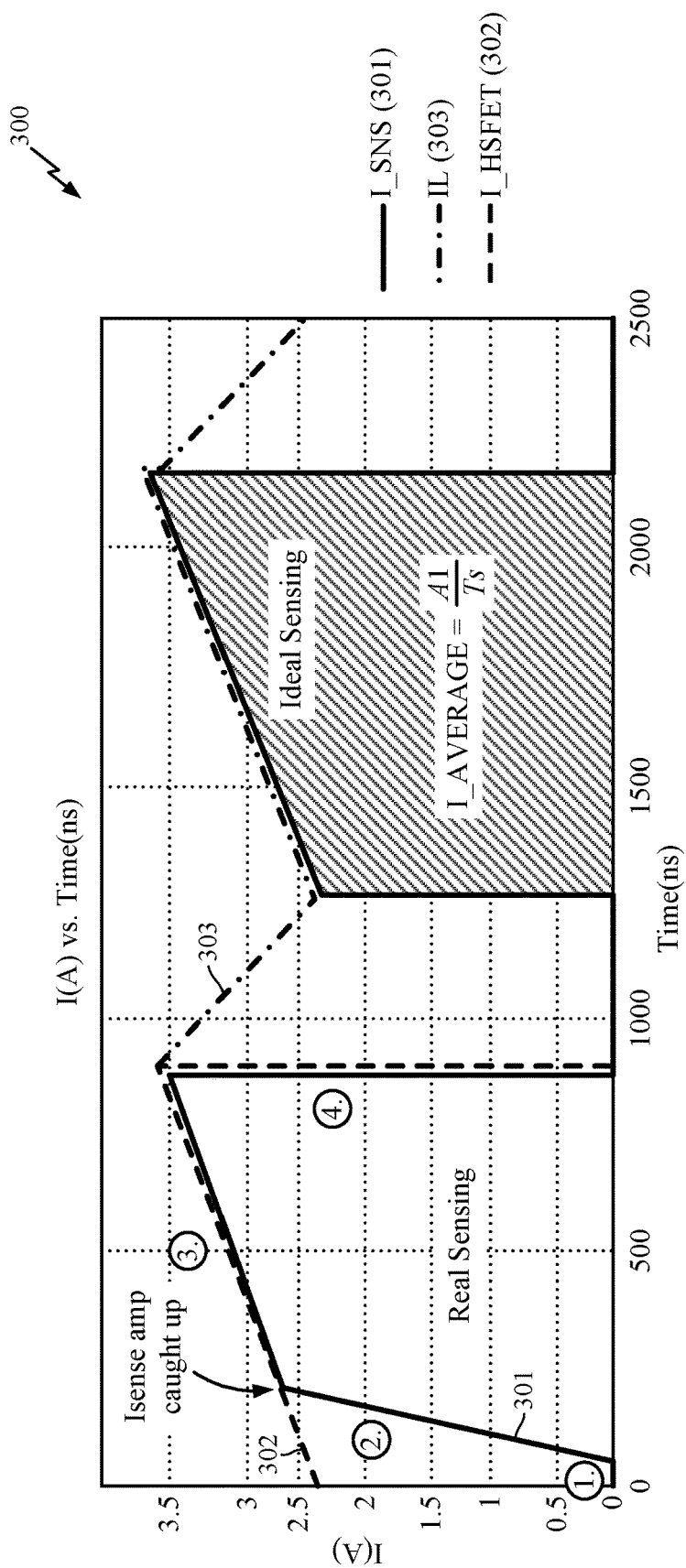
FIG. 3 is an example graph depicting waveforms of actual average current sensing and ideal average current sensing versus time.

FIG. 3 is a time-based graph 300 depicting waveforms of actual average current sensing and ideal average current sensing, illustrating flaws in the actual sensing. The graph 300 illustrates waveforms 301, 302, and 303. Each waveform represents current (in amperes) plotted on the y-axis as a function of time (in nanoseconds, or ns) along the x-axis. Waveform 302 represents the current (I_HSFET) in the high-side FET (e.g., HSFET 201) of a buck converter through two switching periods (two on/off cycles), and would ideally be the current sensed through the high-side FET. Waveform 303 represents the current (IL) through the inductor of the buck converter over the same two periods.

While the high-side FET is off, the inductor current IL is falling, as illustrated by waveform 303. While the high-side FET is on, the inductor current IL is rising. The area under the waveform 303 during this rising edge (or under the waveform 302) is the charge delivered from the input source to the load capacitor of the buck converter. The area under the curve divided by the switching period (Ts) represents the average input current (I_AVERAGE) for that switching period. When multiple average input currents per cycle are averaged, the results can be used as the average input current. However, actual current sensing as typically implemented has several error contributions that lead to inaccurate average input current values.

Waveform 301 represents an example actual current (I_SNS) sensed through the high-side FET (e.g., by a high-side current-sensing amplifier) and the errors that may be present in conventional current sensing through the high-side FET. For example, there may be a blanking time (represented by "1") after the high-side FET is activated at 0 ns, but before the current-sensing amplifier is turned on to sense the current through the high-side FET. After being turned on at expiration of the blanking time, the current-sensing amplifier may experience a finite slew-rate-limited time (represented by "2") before catching up to sensing I_HSFET. After the slew-rate-limited time, the current-sensing amplifier may still have a gain and/or offset error (represented by "3"), leading to inaccurate current sensing. Furthermore, there may be a sampling time error associated with the current-sensing amplifier turning off before the high-side FET turns off (as represented by "4"). Each of these errors may lead to differences between waveform 301 and waveform 302.

Figure 4A:
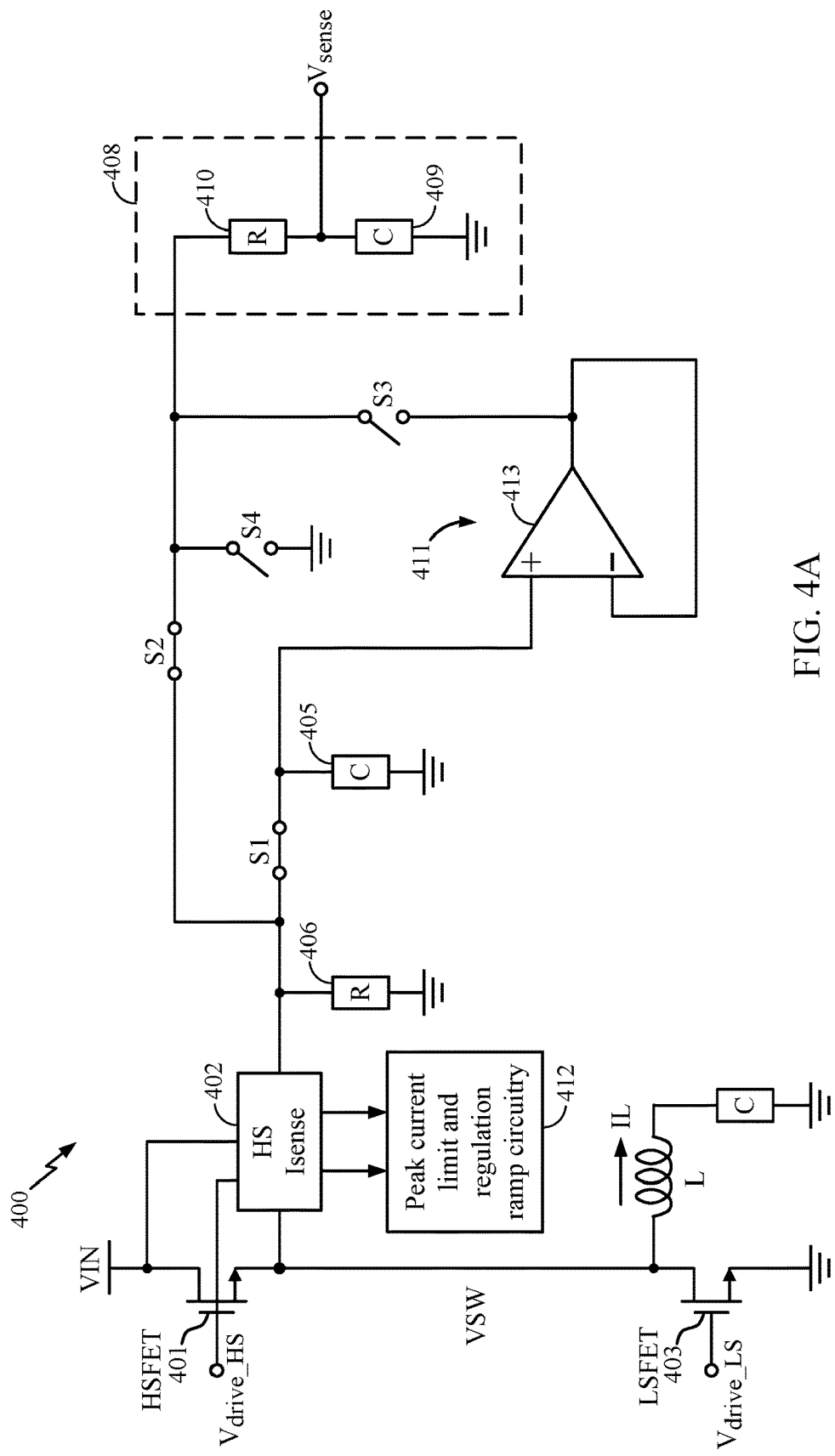
FIGS. 4A-4D include a block diagram of an example current-sensing circuit with error-correction components for connection with a switching regulator, depicting a sequence for accurately sensing average input current in the switching regulator, in accordance with certain aspects of the present disclosure.

FIGS. 4A-4D include a block diagram of an example current-sensing circuit with error-correction components for connection with a switching regulator, depicting a sequence for accurately sensing average input current in the switching regulator FIG. 4A is a block diagram of an example current-sensing circuit 400 with error-correction components for connection with a switching regulator, such as a buck converter, in accordance with certain aspects of the present disclosure. Although not part of the current-sensing circuit 400, FIG. 4A also illustrates a buck converter coupled to the current-sensing circuit. The buck converter includes a high-side field-effect transistor (HSFET) 401, a low-side field-effect transistor (LSFET) 403, an inductor, and a load impedance, represented by a capacitor. The HSFET 401 may be driven by a high-side driver voltage (labeled "$V_{drive\_HS}$"), while the LSFET 403 may be driven by a low-side driver voltage (labeled "$V_{drive\_LS}$"). Since the operation of a buck converter is understood by those skilled in the art, the buck converter will not be further described herein.

Current-sensing circuit 400 includes a high-side current-sensing amplifier 402 (labeled "HS Isense 402") for sensing current in the HSFET 401 and producing a proportional current. The circuit 400 also includes two resistors 406, 410, four switches S1-S4, two capacitors 405, 409, a buffer 411 (implemented by an operational amplifier 413), and peak current limit and regulation ramp circuitry 412. In some aspects, the circuit 400 may include fewer, additional, and/or different components. The circuit 400 may be coupled to the HSFET 401 in such a way that HS Isense 402 can generate an output current that is proportional to the current through the HSFET while the HSFET is turned on. For example, HS Isense 402 may be coupled to the input voltage node (labeled "VIN"), to the gate of HSFET 401 to receive the same gate drive voltage (e.g., $V_{drive\_HS}$), and to the switch node (labeled "VSW"), as depicted in FIG. 4A.

The current-sensing amplifiers (e.g., HS Isense 402) in the present disclosure may be implemented with current-controlled current sources, which may convert current in the transistor being sensed to a much smaller current. Persons having ordinary skill in the art will be familiar with this technique.

Figure 12:
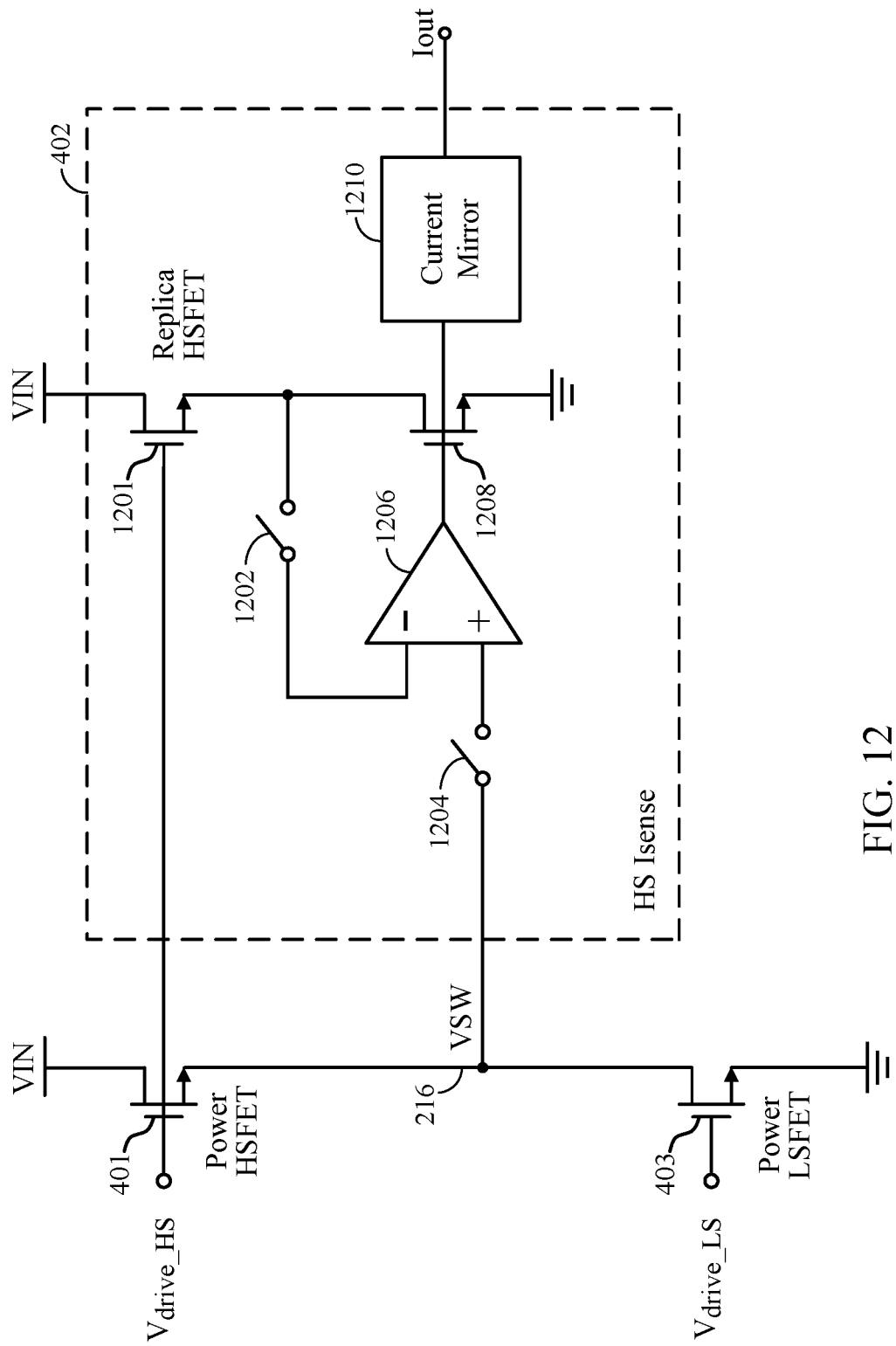
FIG. 12 a block diagram of an example high-side current-sensing amplifier, in accordance with certain aspects of the present disclosure.

FIG. 12 a block diagram of an example circuit internal to HS Isense 402, in accordance with certain aspects of the present disclosure. The internal circuit includes a replica HSFET 1201, switches 1202 and 1204, amplifier 1206, transistor 1208, and current mirror 1210. The replica HSFET 1201 (also referred to as the "pilot HSFET") may use the same technology as the HSFET 401 (which may be referred to as the "power HSFET" to distinguish from the replica HSFET), but with a smaller channel width for lower current capability for the same gate-to-source voltage ($V_{GS}$). The drain of the replica HSFET 1201 is connected to the same input voltage as the HSFET 401 (in this case, VIN). The amplifier 1206 has an output configured to drive the gate of transistor 1208, which has a drain connected with the source of the replica HSFET 1201. The source of transistor 1208 may be connected to the reference potential node (e.g., electrical ground) for the internal circuit. The negative input of the amplifier 1206 is selectively coupled (via switch 1202) to the source of the replica HSFET 1201, and the positive input of the amplifier 1206 is selectively coupled (via switch 1204) to switch node 216. In this manner, the amplifier 1206 will drive transistor 1208 such that the source voltage of the replica HSFET 1201 will match the source voltage of the HSFET 401. In this manner, because the gate drive voltage is the same for both the replica HSFET 1201 and the HSFET 401, the $V_{GS}$ of the replica HSFET 1201 will match the $V_{GS}$ of the HSFET 401, and the current through the replica HSFET 1201 will be proportional to (and smaller than) the current through the HSFET 401. The output of the amplifier 1206 is also coupled to the input (e.g., a gate drive for a current source transistor) of the current mirror 1210. The current mirror 1210 will produce an output current that is proportional to the input current through the voltage-controlled current source of the current mirror input branch. Therefore, the HS Isense 402 may be considered as having a constant current gain ($\beta$) that is much less than 1, such that the controlled output current (Iout) produced is much smaller than the controlling input current through the HSFET 401. The switches 1202 and 1204 may be used to decouple the inputs to the amplifier 1206 from the sources of the replica HSFET 1201 and the HSFET 401, respectively, when the replica HSFET 1201 and the HSFET 401 are turned off. During this time, the inputs to the amplifier 1206 may be coupled (e.g., via other switches not shown) to other nodes, such as to the input voltage node (VIN). Those skilled in the art will understand that the internal circuit of FIG. 12 is only one example of a current-sensing amplifier and that there are other topologies to implement a current-sensing amplifier or ways to produce an output current that is proportional to the HSFET current.

Returning to FIG. 4A, an output terminal of HS Isense 402 connects to a first terminal of resistor 406 (a shunt resistor), a first terminal of switch S1, and a first terminal of switch S2. A second terminal of switch S1 connects to a first terminal of capacitor 405 (a shunt capacitor) and a positive input terminal of the op-amp 413. A second terminal of switch S2 connects to a first terminal of switch S3, a first terminal of switch S4, and a first terminal of resistor 410, whose second terminal connects to a first terminal of capacitor 409. An output terminal of the op-amp 413 connects to a second terminal of switch S3 and to a negative input terminal of the op-amp 413, forming a feedback path such that this amplifier functions as a buffer. A second terminal of resistor 406, a second terminal of capacitor 405, a second terminal of switch S4, and a second terminal of capacitor 409 each connect to a reference potential node (e.g., electrical ground) for the circuit 400. Resistor 410 and capacitor 409 form a low-pass filter 408, having an input coupled to the first terminal of switch S3, the first terminal of switch S3, and the second terminal of switch S2. The output of the low-pass filter 408 at the second terminal of resistor 410 and the first terminal of capacitor 409 may also be the output of the circuit 400. Although not shown, the output of the circuit 400 may connect to control logic of the buck converter.

Figure 4B:
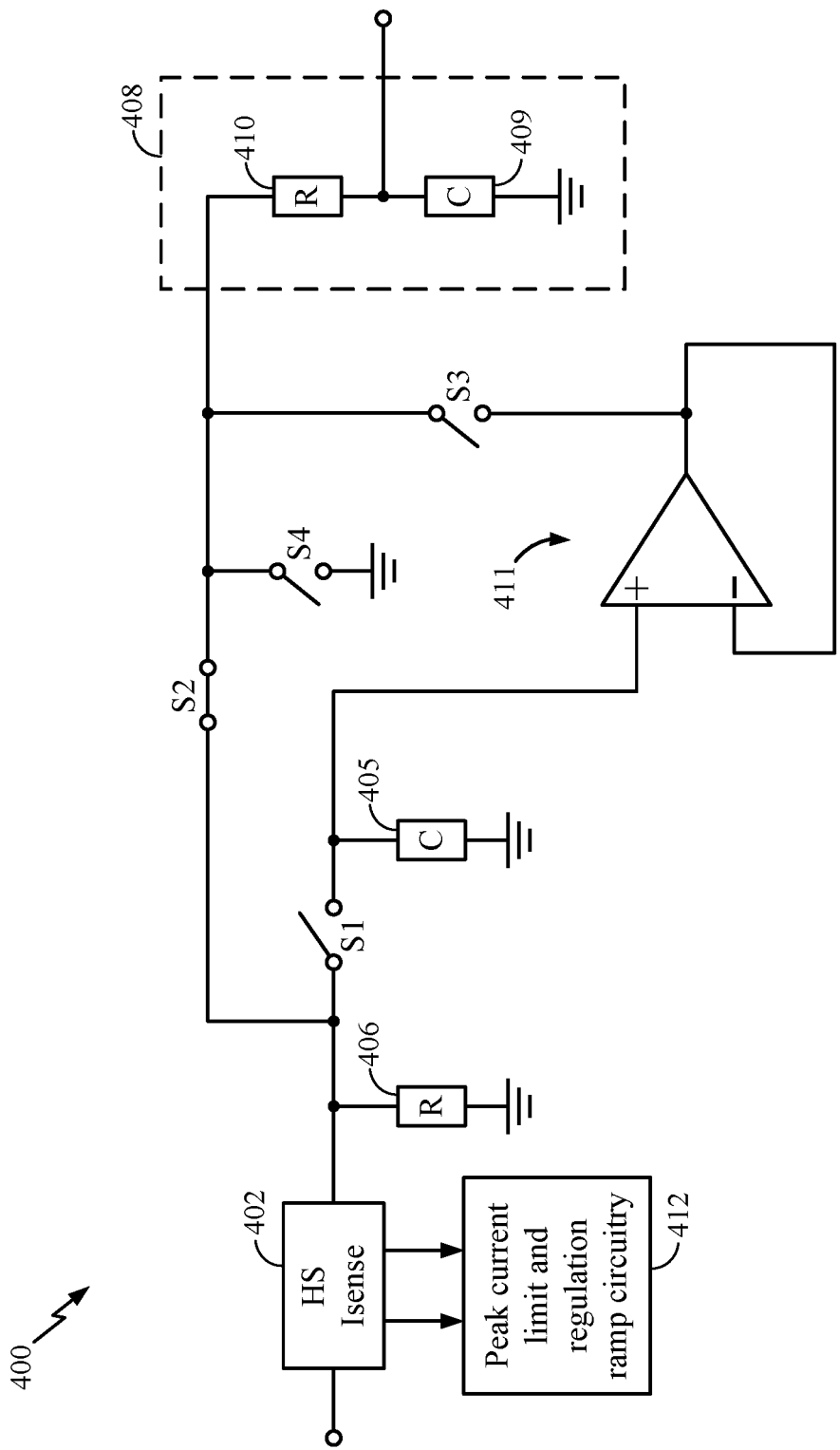
Figure 4C:
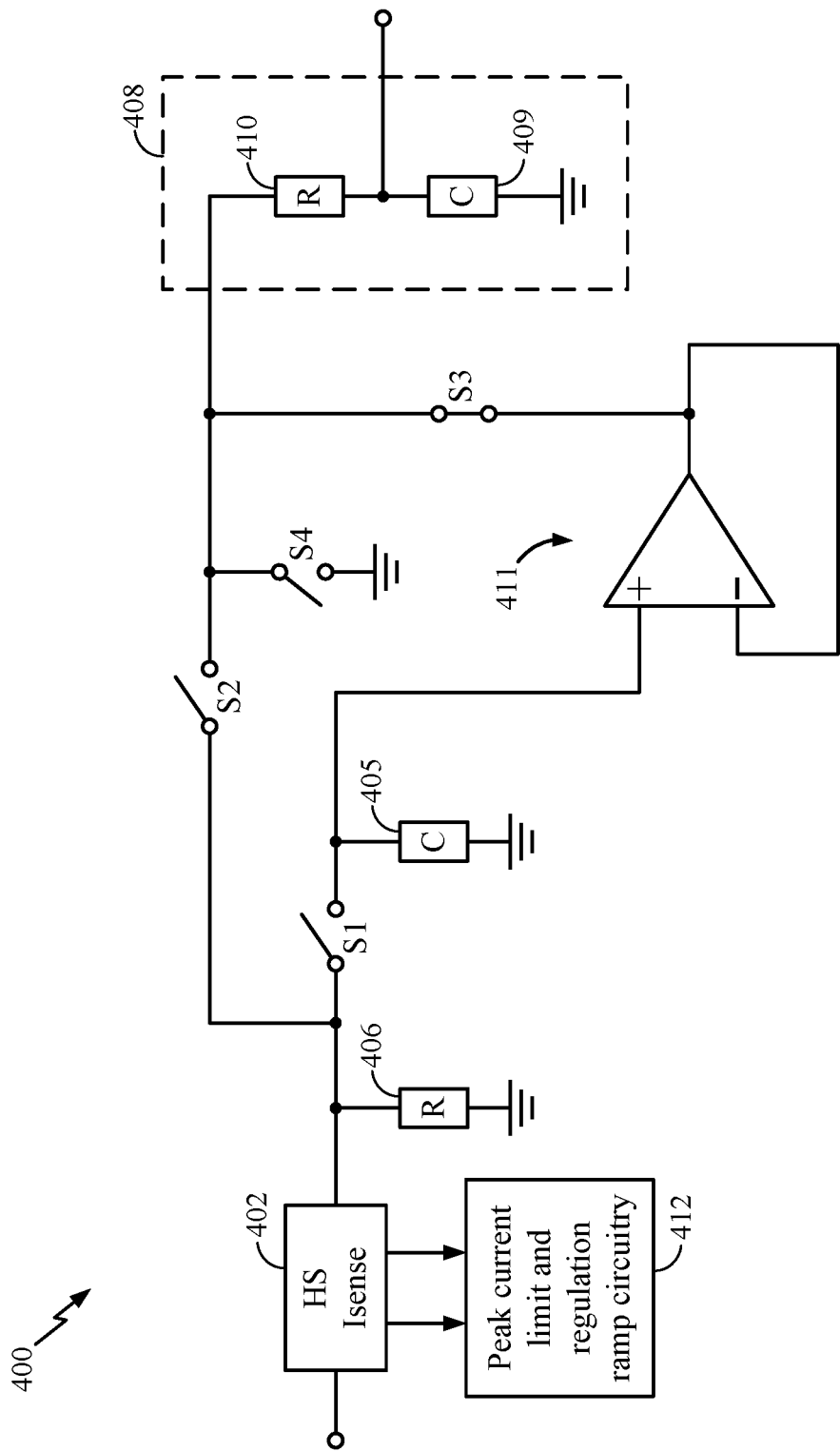
Figure 4D:
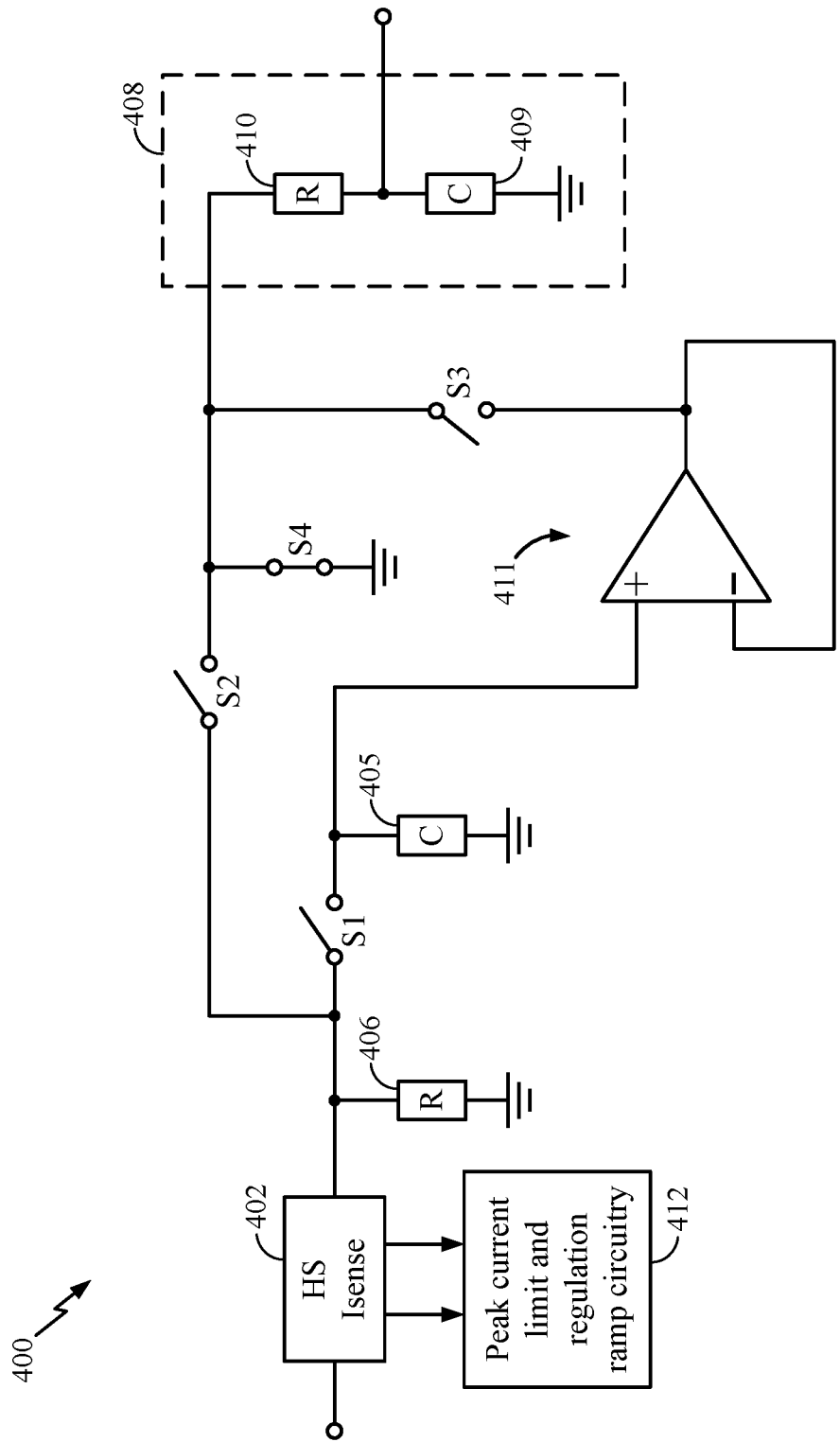
Figure 5:
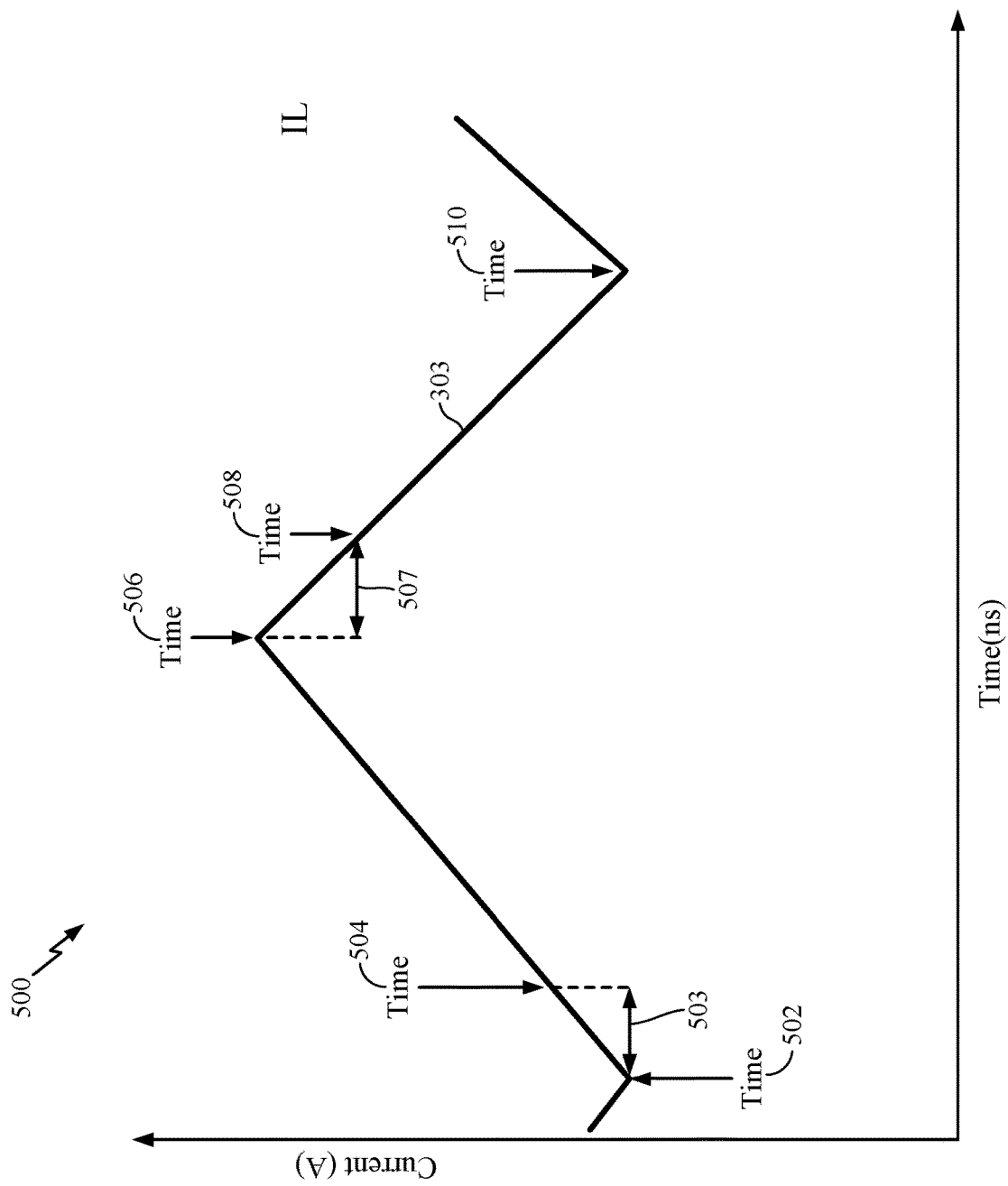
FIG. 5 is a time-based graph depicting an example waveform of inductor current and the timing of different states of the current-sensing circuit of FIGS. 4A-4D, in accordance with certain aspects of the present disclosure.

FIG. 5 is a time-based graph 500 depicting inductor current (IL) and the timing of different states of the current-sensing circuit 400 of FIGS. 4A-4D, in accordance with certain aspects of the present disclosure. The graph 500 illustrates waveform 303 representing current (in amperes) through the inductor of a buck converter plotted on the y-axis as a function of time (in nanoseconds, or ns) along the x-axis. Waveform 303 illustrates a little more than one full switching cycle of the switching regulator and is shown with five different times (e.g., time 502, time 504, time 506, time 508, and time 510) indicating the beginning and end of four different phases of operation of the circuit 400 for each switching cycle: an error phase (time 502 to time 504), a sample-and-hold phase (time 504 to time 506), a current-correction phase (time 506 to time 508), and an intermediate phase (time 508 to time 510). Time 510 is similar to time 502, but for a subsequent switching cycle.

At the beginning of a switching cycle, the HSFET turns on, and the LSFET turns off. At or shortly after time 502 (e.g., the beginning of the sequence), switches S1 and S2 close, and switches S3 and S4 are opened, as illustrated in FIG. 4A. In this state, HS Isense 402 begins sensing the current through the HSFET, which creates a voltage across resistor 406 that charges capacitor 405 through closed switch S1. The low-pass filter 408 also receives the voltage across resistor 406 through closed switch S2, causing the output voltage of the circuit 400 to ramp up during a settling interval 503 from time 502 to time 504. The output voltage of the circuit 400 is proportional to the input current. The settling interval 503 may be any suitable interval to allow for the blanking time and the slew-rate-limited time of HS Isense 402 to pass. For example, the settling interval 503 should be chosen to be longer than the sum of the HS Isense blanking time and the slew-rate-limited time. For example, if the HS Isense takes 100 ns to catch up to the HSFET current, then the settling interval 503 should be chosen to be longer than 100 ns.

At time 504, switch S1 opens, while switch S2 remains closed and while switches S3 and S4 remain opened, as illustrated in FIG. 4B. During the sample-and-hold phase between time 504 and time 506, the voltage across resistor 406 at time 504 is held in capacitor 405, while the low-pass filter 408 continues to filter the voltage across resistor 406 via closed switch S2 as this voltage continues to rise from time 504 to time 506 while the HSFET is turned on.

Based on the duty cycle of the buck converter, the HSFET is turned off, and the LSFET is turned on at time 506, causing waveform 303 to ramp down until the next switching cycle begins, repeating the sequence. Based on this change, at time 506, switch S2 opens, and switch S3 closes while switches S1 and S4 remain opened, as illustrated in FIG. 4C. In this configuration, the voltage stored in capacitor 405 is applied via the buffer 411 and the closed switch S3 to the input of the low-pass filter 408, thereby applying an error correction, or at least an adjustment, to the current-sensing circuit 400 during the correction interval 507 from time 506 to time 508. The correction interval 507 may be any suitable interval to adequately compensate for the error made during the settling interval 503, using the sampled and held voltage across capacitor 405. For example, the correction interval 507 may be less than or equal to 200 ns for certain aspects.

At time 508, switch S3 opens, and switch S4 closes, while switches S1 and S2 remain opened, as illustrated in FIG. 4D. During the intermediate phase between time 508 and time 510, capacitor 405 continues to discharge, and the input to the low-pass filter 408 is shorted to ground via closed switch S4. Therefore, capacitor 409 is discharged through resistor 410 for the remainder of the switching cycle, where the HSFET is turned off and the LSFET is turned on.

Although only a first order passive low-pass filter is illustrated in FIG. 4A, those having ordinary skill in the art understand that the low-pass filter 408 may be implemented by any number of different low-pass filter topologies, may be active or passive, and may be more complex than first order. For example, the low-pass filter 408 may be implemented by an integrator, which can function as a low-pass filter. Such an integrator may be part of a control circuit that implements an active input current limit, which may be specified for certain applications (e.g., battery charging applications). Alternatively, the output of the low-pass filter may be used directly as a real-time measurement of average input current.

Figure 6:
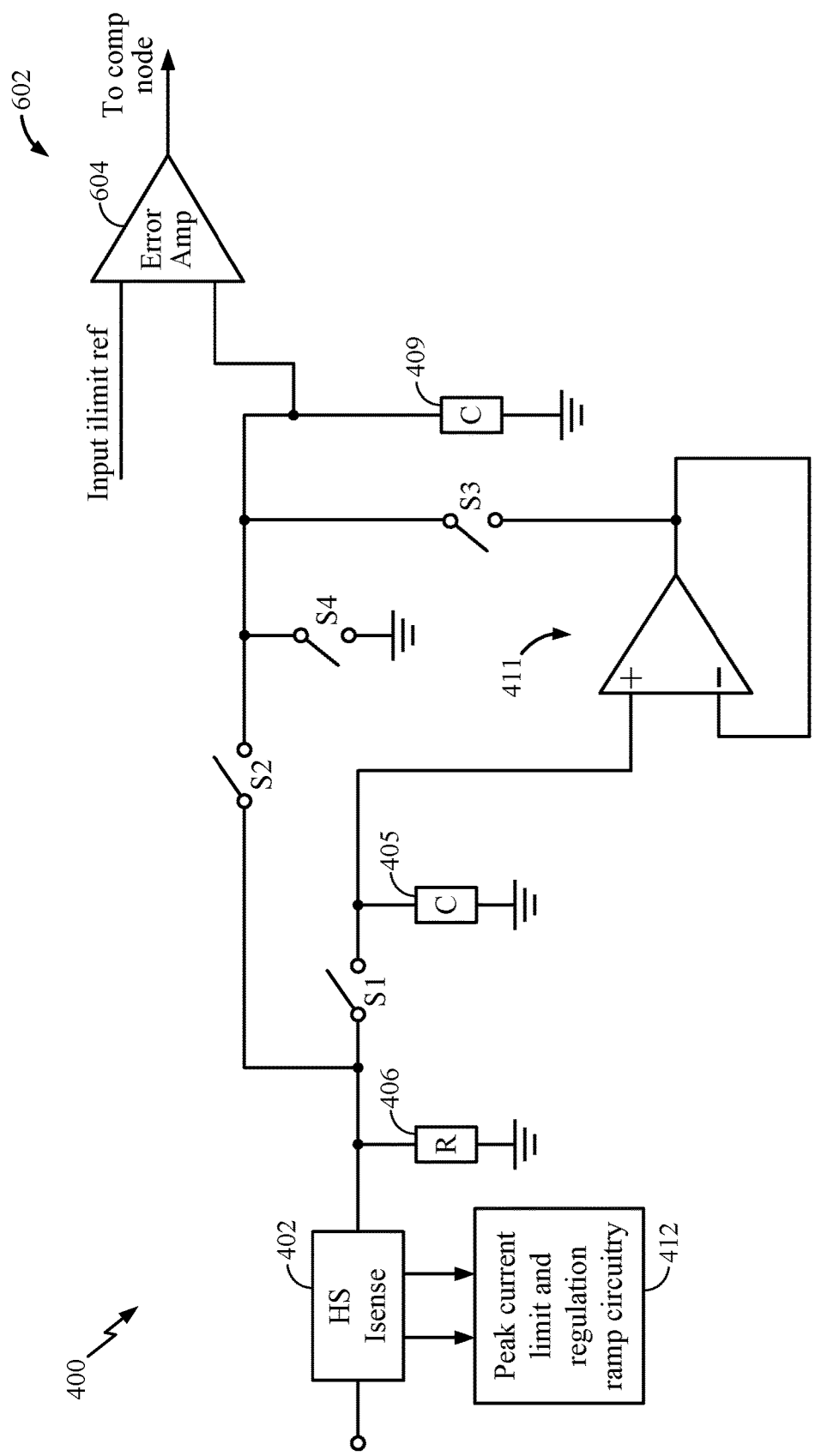
FIG. 6 is a block diagram of an example current-sensing circuit with error-correction components, which replaces the low-pass filter of FIGS. 4A-4D with an integrator, in accordance with certain aspects of the present disclosure.

FIG. 6 is a block diagram of the example current-sensing circuit 400 with error-correction components, where the low-pass filter 408 is replaced by an integrator 602, in accordance with certain aspects of the present disclosure. The integrator 602 is implemented by an error amplifier 604 (labeled "Error Amp"). An input current limit reference node (labeled "Input ilimit ref") connects to a first input terminal of Error Amp 604, whose output terminal connects to the output terminal of the circuit 400. The second input terminal of Error Amp 604 is connected to the first terminal of capacitor 409, the first terminal of switch S3, the first terminal of switch S4, and the second terminal of switch S2. For certain aspects, the current-sensing circuit 400 of FIG. 6 may be combined with elements shown in FIG. 2 to implement a battery charging circuit with both an input current loop and a voltage loop.

Figure 7:
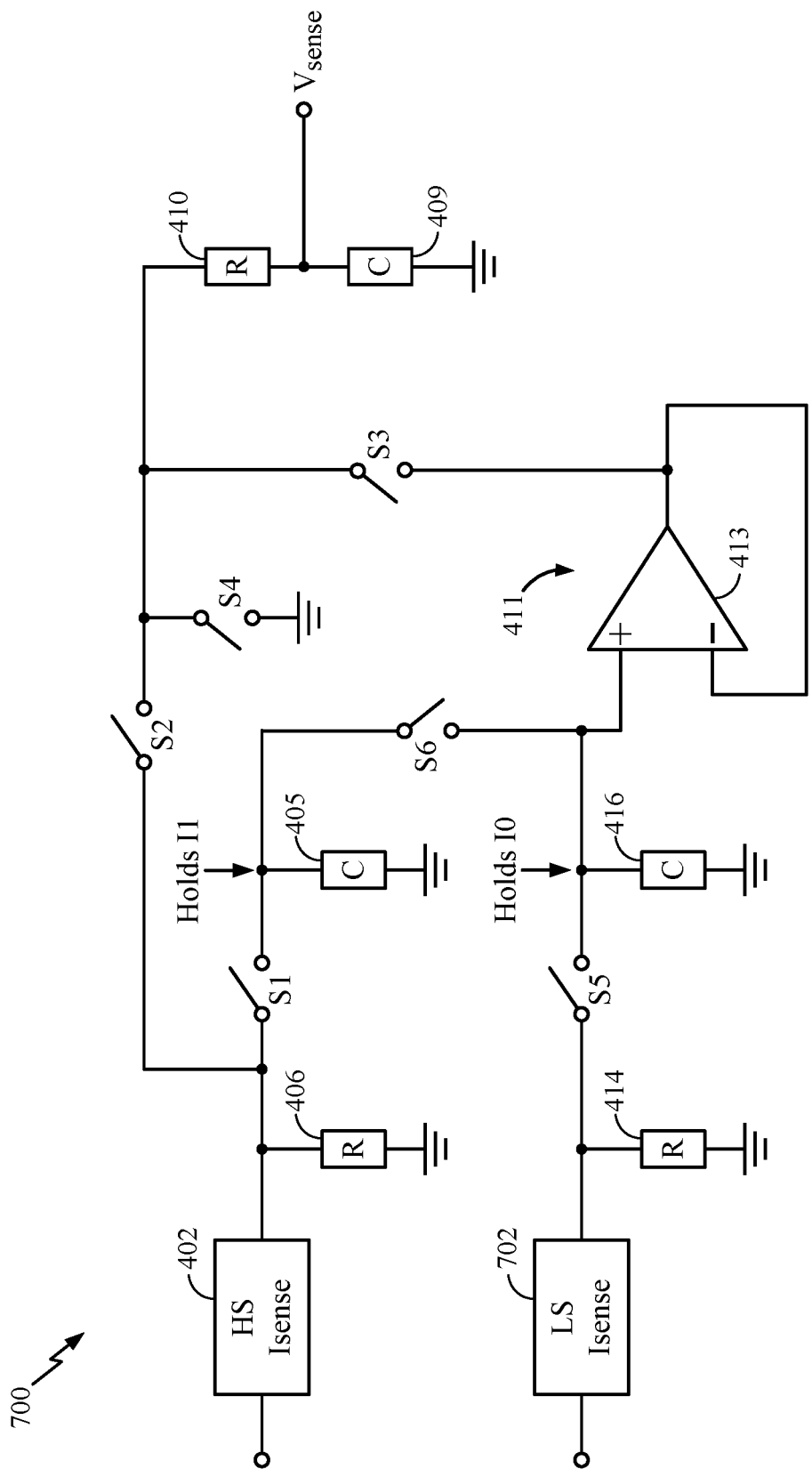
FIG. 7 is a block diagram of an example current-sensing circuit with error-correction components, for both high-side and low-side sensing, in accordance with certain aspects of the present disclosure.

FIG. 7 is a block diagram of an example current-sensing circuit 700 with error-correction components, for both high-side and low-side current sensing, in accordance with certain aspects of the present disclosure. Circuit 700 may provide increased accuracy compared to circuit 400. In addition to the components shown and described above with respect to the circuit 400 in FIGS. 4A-4D, the circuit 700 includes a low-side current-sensing amplifier 702 (labeled "LS Isense"), resistor 414, capacitor 416, and switches S5 and S6. The input terminal of LS Isense 702 is coupled to measure current through the LSFET of the buck converter. The output terminal of LS Isense 702 connects to a first terminal of resistor 414 and to a first terminal of switch S5. A second terminal of switch S5 connects to a first terminal of capacitor 416, to a second terminal of switch S6, and to the positive input terminal of op-amp 413. A first terminal of switch S6 connects to the second terminal of switch 51 and to the first terminal of capacitor 405. The second terminals of resistor 414 and capacitor 416 connect to ground.

Figure 8A:
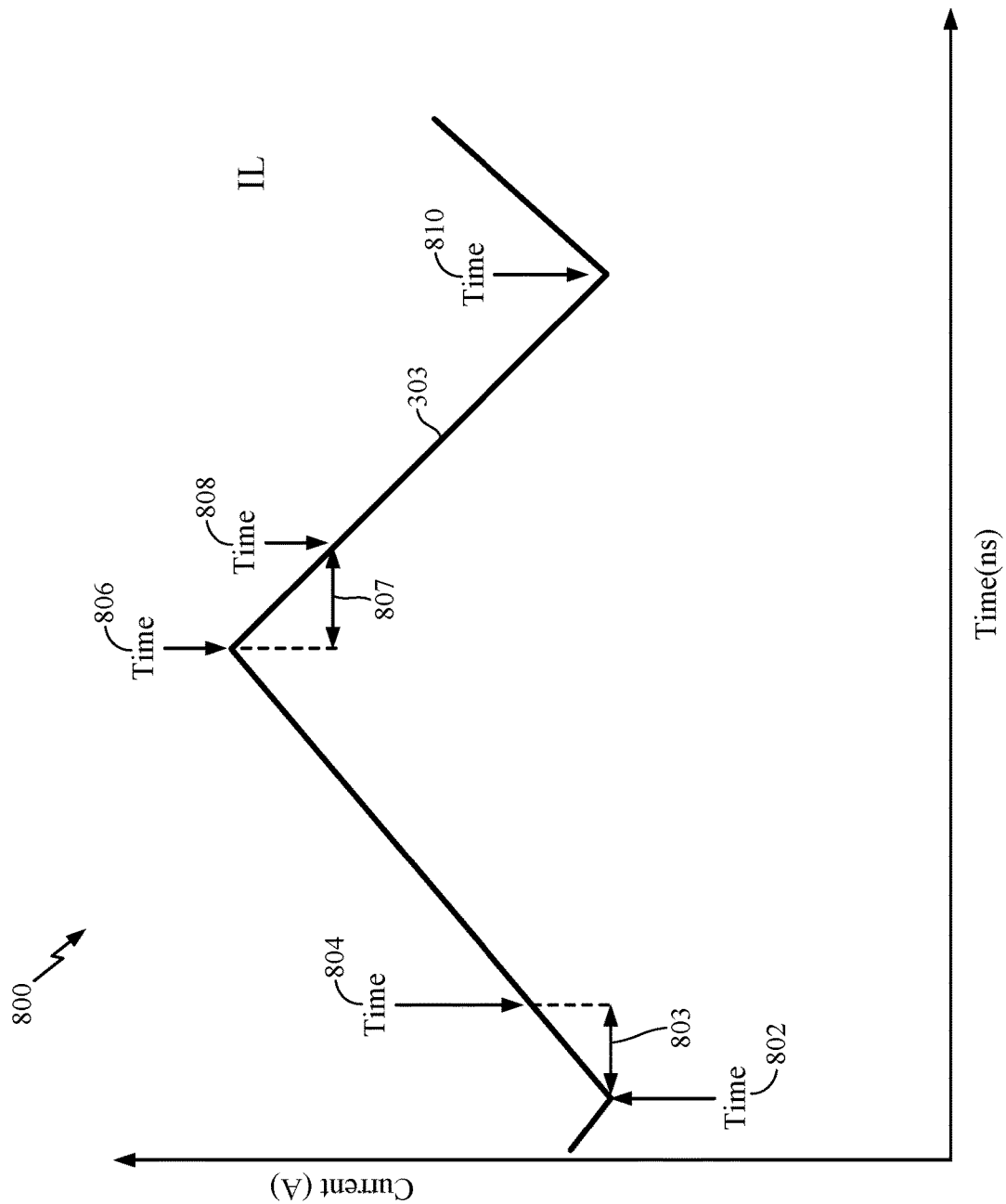
FIG. 8A is a time-based graph depicting an example waveform of inductor current and the timing of different states of the current-sensing circuit of FIG. 7, in accordance with certain aspects of the present disclosure.
Figure 8B:
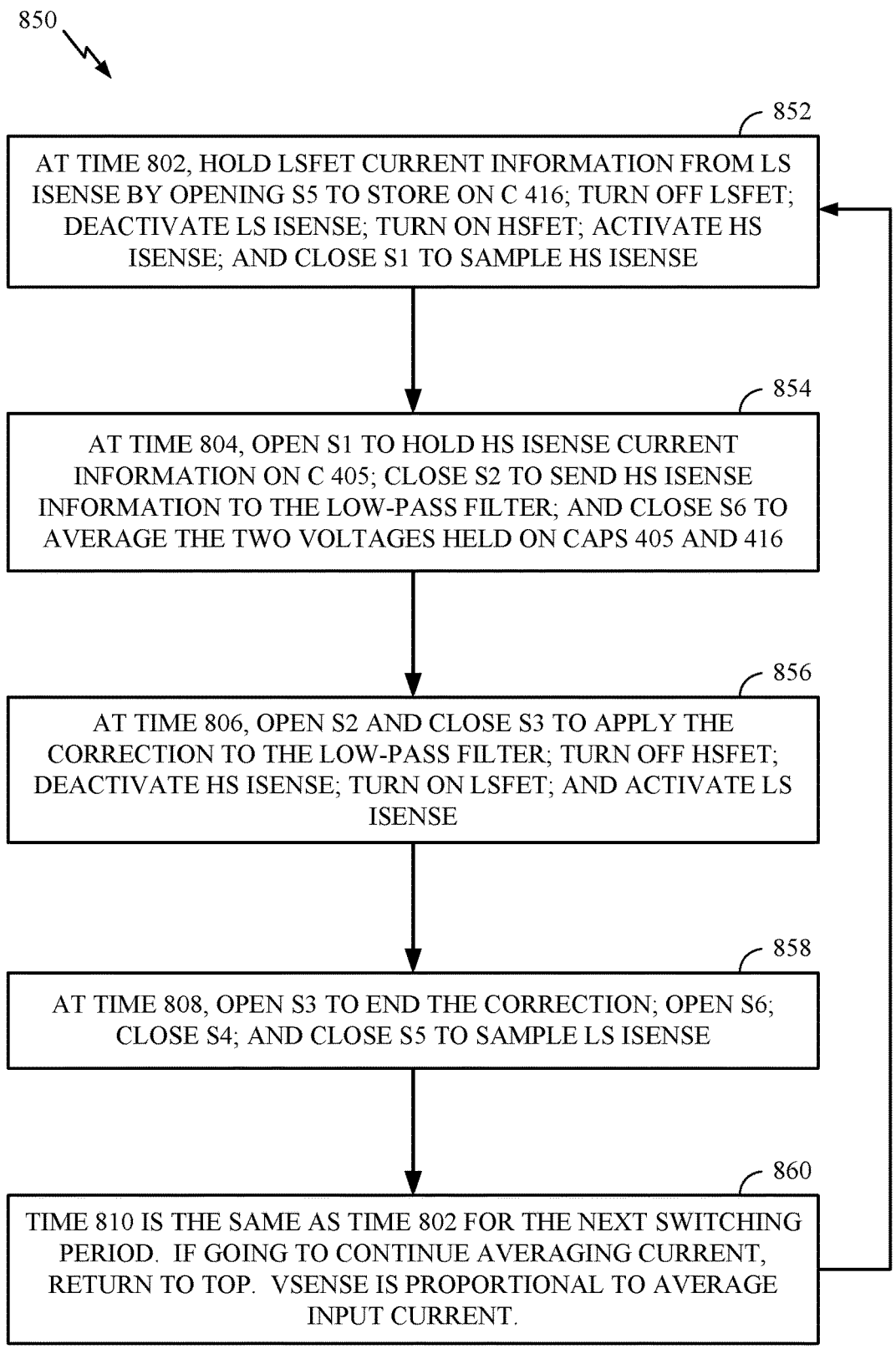
FIG. 8B is a flow diagram of example operations for both high-side and low-side current sensing using the current-sensing circuit of FIG. 7, in accordance with certain aspects of the present disclosure.

FIG. 8A is a time-based graph 800 depicting inductor current (IL) and the timing of different states of the current-sensing circuit 700 of FIG. 7, in accordance with certain aspects of the present disclosure. The graph 800 illustrates waveform 303 representing current (in amperes) through the inductor of a buck converter plotted on the y-axis as a function of time (in nanoseconds, or ns) along the x-axis. Waveform 303 is shown with five different times (e.g., time 802, time 804, time 806, time 808, and time 810) indicating the beginning and end of four different phases of operation of the circuit 700: a high-side error and low-side hold phase (time 802 to time 804), a high-side sample-and-hold phase (time 804 to time 806), a high-side current-correction phase (time 806 to time 808), and a low-side sample phase (time 808 to time 810). Time 810 is similar to time 802, but for a subsequent switching cycle. FIG. 8B is a flow diagram of example operations 850 for both high-side and low-side current sensing using the current-sensing circuit of FIG. 7 and coincides with the graph 800 of FIG. 8A, in accordance with certain aspects of the present disclosure.

At the beginning of a switching cycle, the HSFET (e.g., HSFET 401) turns on, and the LSFET (e.g., LSFET 403) turns off. At time 802 (e.g., the beginning of the sequence) as illustrated in block 852, switch S1 closes, and switch S5 opens, while switches S2, S3, S4, and S6 remain opened. Also, HS Isense 402 is activated, and LS Isense 702 is deactivated. In this state, HS Isense 402 begins sensing the current through the HSFET, which creates a voltage across resistor 406 that charges capacitor 405 through closed switch S1. Also in this state, the voltage across resistor 414 (proportional to the current through the LSFET as sensed by LS Isense 702) at time 802 is stored by capacitor 416 by opening switch S5. The settling interval 803 from time 802 to time 804 may be any suitable interval to allow for the blanking time and the slew-rate-limited time of HS Isense 402 to occur. For example, the settling interval 803 may be a value less than or equal to 200 ns.

At time 804 as illustrated in block 854, switch S1 opens, and switches S2 and S6 close, while switches S3, S4, and S5 remain opened. Opening switch S1 at time 804 holds the HS Isense current information (e.g., proportional to the current through the HSFET as sensed by HS Isense 402 and converted to a voltage by resistor 406) on capacitor 405. During the high-side sample-and-hold phase between time 804 and time 806, the voltage across resistor 406 sampled at time 804 is held in capacitor 405. The low-pass filter 408 receives the voltage across resistor 406 (e.g., the HS Isense current information) through closed switch S2, causing the output voltage ($V_{sense}$) of the circuit 700 to ramp up while the HSFET is turned on. Additionally, the voltages held in capacitors 405 and 416 are effectively averaged while switch S6 is closed during the high-side sample-and-hold phase.

Based on the duty cycle of the buck converter, the HSFET is turned off, and the LSFET is turned on at time 806, causing waveform 303 to ramp down until the next switching cycle begins, repeating the sequence. Based on this change, at time 806 as illustrated in block 856, switch S2 opens, and switch S3 closes, while switch S6 remains closed and while switches S1, S4, and S5 remain opened. Also, HS Isense 402 is deactivated, and LS Isense 702 is activated. In this configuration, the average of the voltages stored in capacitors 405 and 416 is applied via the buffer 411 and the closed switch S3 to the input of the low-pass filter 408, thereby applying an error correction, or at least an adjustment, to the current-sensing circuit 700 during the correction interval 807 from time 806 to time 808. The correction interval 807 may be any suitable interval to adequately compensate for the error made during the settling interval 803, using the averaged voltage across the capacitors 405 and 416. For example, the correction interval 807 may be a value between 1 ns and 500 ns and, in some instances, may be the same as the settling interval 803. For example, the correction interval 807 may be 170 ns when the settling interval 803 is 170 ns.

At time 808 as illustrated in block 858, switches S3 and S6 open, and switches S4 and S5 close, while switches S1 and S2 remain opened. During the low-side sampling phase between time 808 and time 810, capacitor 405 continues to discharge, and the input to the low-pass filter 408 is shorted to ground via closed switch S4. Therefore, capacitor 409 is discharged through resistor 410 for the remainder of the switching cycle, where the HSFET is turned off and the LSFET is turned on. Also in this state, LS Isense 702 begins sensing the current through the LSFET, which creates a voltage across resistor 414 that charges capacitor 416 through closed switch S5.

Time 810 is equivalent to time 802, but for the next switching period of the buck converter, as illustrated in block 860. If it is desired to continue averaging current, then the operations 850 may be repeated, starting with block 852. The output voltage ($V_{sense}$) of the circuit 700 is proportional to the average input current for the buck converter and is corrected for the missing current information during the blanking times and slew-rate-limited times for both the HSFET and the LSFET, thereby providing an accurate average input current.

A capacitor, as described herein, may be a fixed capacitor or a variable capacitor and may be an electrolytic capacitor, an aluminum electrolytic capacitor, a tantalum electrolytic capacitor, a super capacitor, a ceramic capacitor, a power film capacitor, polypropylene capacitor, a polycarbonate capacitor, a silver mica capacitor, an integrated-circuit (IC) capacitor, a double-layer capacitor, a pseudo-capacitor, or hybrid capacitors. The capacitors in circuits 400, 700 may be any suitable capacitance value, for example, in the range of picofarads (pF), nanofarads (nF), or microfarads (μF).

A resistor, as described herein, may be a fixed resistor or a variable resistor (e.g., adjustable resistor, potentiometer, resistance decade box, or a thermistor). A resistor may be any resistive value, for example, in the range of ohms (Ω), kilo-ohms (kΩ), or mega-ohms (MΩ).

Figure 9:
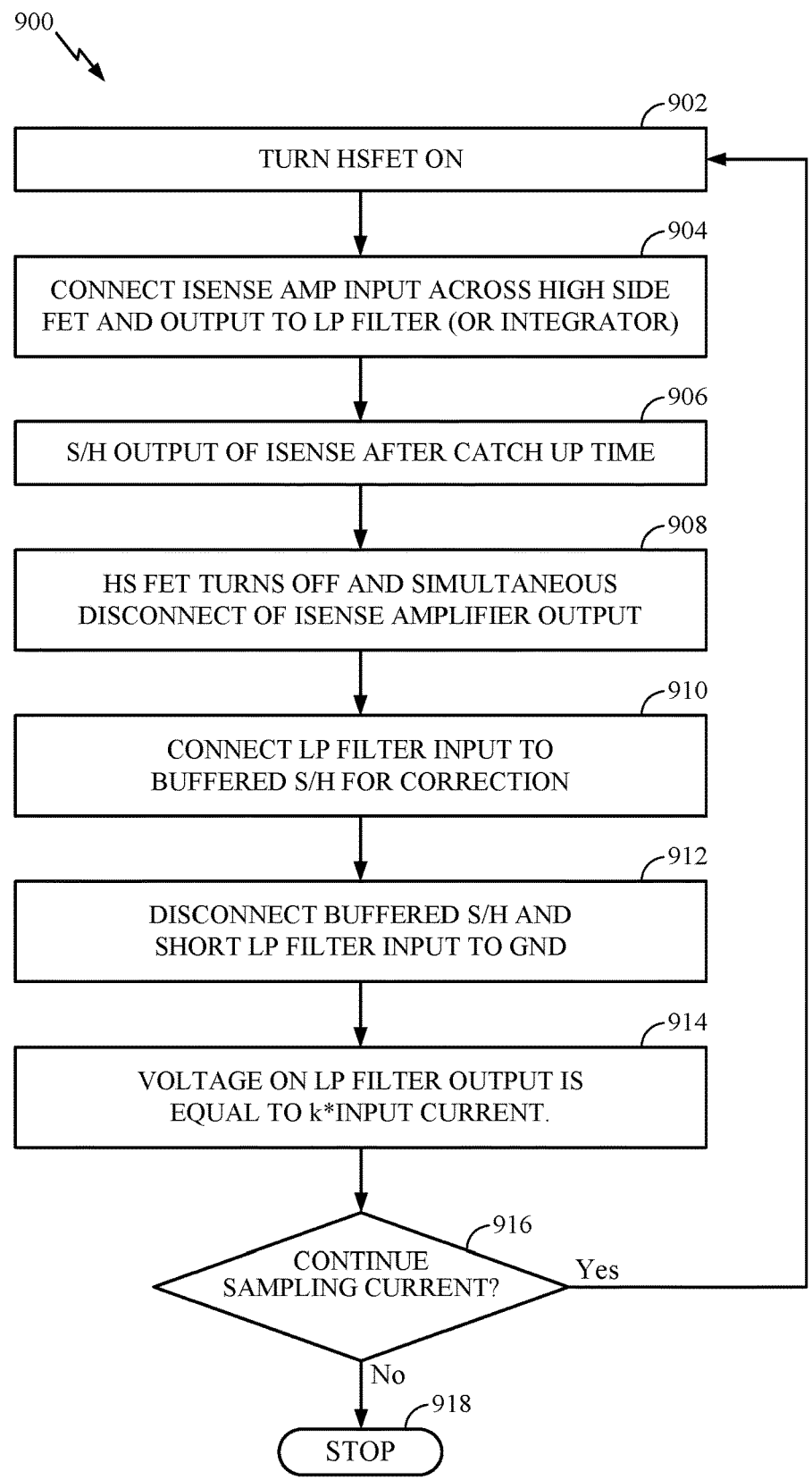
FIG. 9 is a flow diagram depicting an error-correction process for accurately sensing average input current in a buck converter, in accordance with certain aspects of the present disclosure.

FIG. 9 is a flow diagram of an example process 900 for accurately sensing average input current in a buck converter, in accordance with certain aspects of the present disclosure. Additional, fewer, or different operations may be performed, depending on the implementation of the process. The process 900 may be implemented by a system such as circuit 400 of FIGS. 4A-4D, circuit 600 of FIG. 6, or circuit 700 of FIG. 7.

The process 900 may begin, at operation 902, the system turns on a high-side FET. At operation 904, the system connects the input of a high-side current sense amplifier (HS Isense amp) across the high-side FET and the output to a low-pass (LP) filter (which may be implemented by an integrator). After a catch-up time (e.g., a settling interval), the system samples and holds (S/H) the output of the HS Isense amp at operation 906. At operation 908, the system turns off the HS FET and concurrently disconnects the output of the HS Isense amp from the LP filter. At operation 910, the system connects the LP filter input to a buffered version of the S/H value to apply a current adjustment (e.g., a correction). At operation 912, the system disconnects the buffered S/H value and shorts the LP filter input to electrical ground (GND) or another reference potential for the system. At operation 914, the voltage on the LP filter output is proportional to the input current (e.g., equal to k*input current). At operation 916, the system checks whether to continue sampling the input current. If yes, then the system proceeds back to operation 902 to repeat process 900; otherwise, the system proceeds to operation 918 to stop process 900.

Figure 10:
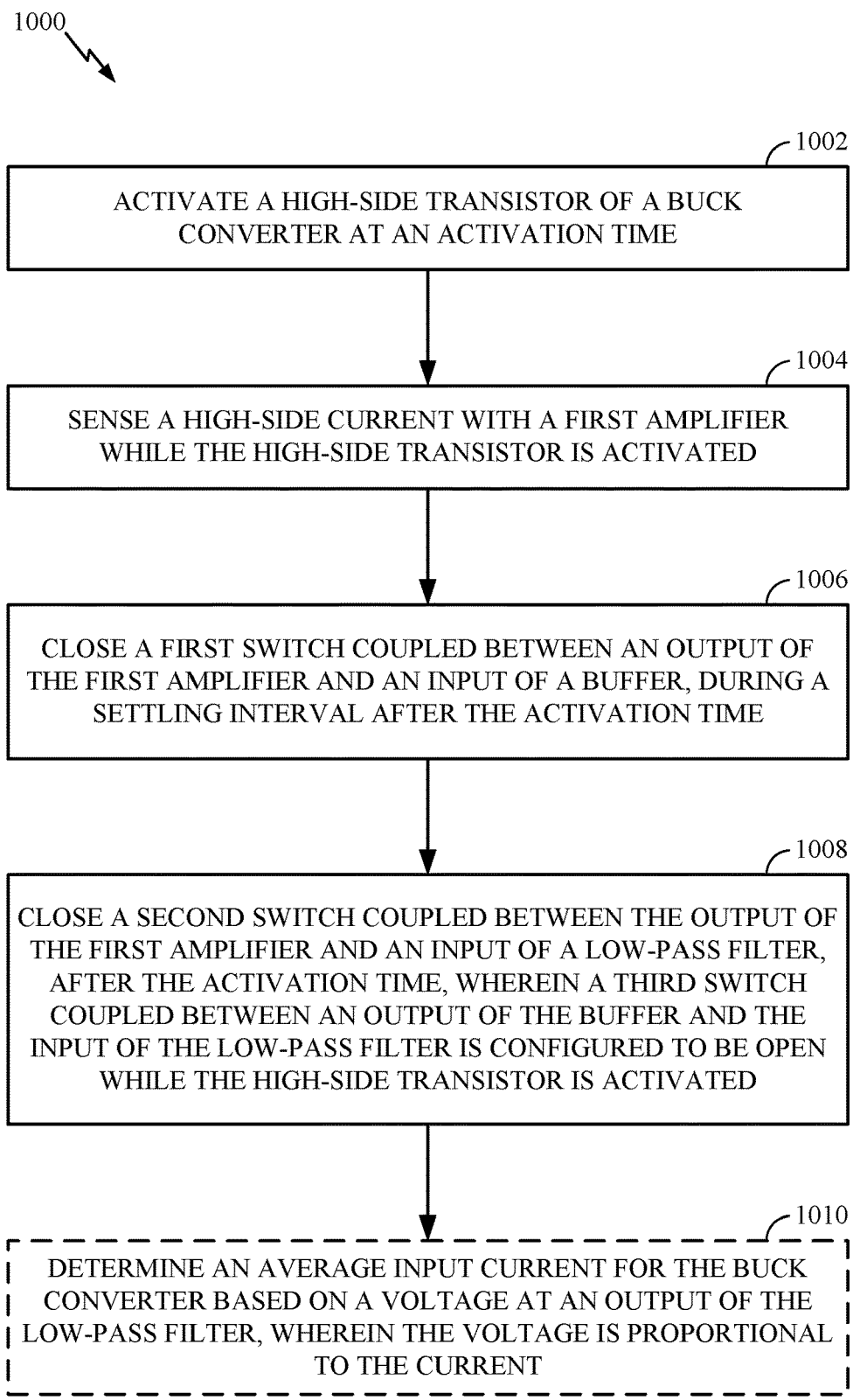
FIGS. 10 and 11 are flow diagrams of example operations for current sensing and correction in a buck converter, in accordance with certain aspects of the present disclosure.

FIG. 10 is a flow diagram of an example process 1000 for current sensing and correction in a buck converter, in accordance with certain aspects of the present disclosure. Additional, fewer, or different operations may be performed, depending on the implementation of the process 1000. The process 1000 may be implemented by a system, such as circuit 400 of FIGS. 4A-4D, circuit 600 of FIG. 6, or circuit 700 of FIG. 7, where it is understood that the buck converter comprises a high-side transistor (e.g., HSFET 401) coupled to a low-side transistor (e.g., LSFET 403). The system may also include a controller for controlling the states of the various transistors and switches therein.

The process 1000 may begin, at operation 1002, by activating the high-side transistor at an activation time (e.g., time 502 or 802). At operation 1004, a first amplifier (e.g., a current-sensing amplifier, such as HS Isense 402) senses a high-side current while the high-side transistor is activated. At operation 1006, the system closes a first switch (e.g., switch S1) coupled between an output of the first amplifier and an input of a buffer (e.g., buffer 411). Closure of the first switch may occur during a first interval (e.g., a settling interval, such as settling interval 503 or 803) associated with the high-side transistor after the activation time. At operation 1008, the system closes a second switch (e.g., switch S2) coupled between the output of the first amplifier and an input of a low-pass filter (e.g., low-pass filter 408), after the activation time. The system may include a third switch (e.g., switch S3) coupled between an output of the buffer and the input of the low-pass filter. The third switch may be configured to be open while the high-side transistor is activated.

According to certain aspects, the process 1000 may further involve the system determining an average input current for the buck converter based on a voltage at an output of the low-pass filter, wherein the voltage is proportional to the current, at optional operation 1010.

According to certain aspects, a fourth switch (e.g., switch S4) is coupled between the input of the low-pass filter and a reference node (e.g., electrical ground) for the buck converter. In this case, the fourth switch may be configured to be open while the second switch is closed. For certain aspects, the process 1000 further entails opening the first switch after the first interval ends and while the high-side transistor is activated. For certain aspects, the process 1000 further involves deactivating the high-side transistor at a deactivation time (e.g., at time 506 or 806), opening the second switch after the deactivation time, and closing the third switch for the buffer to apply a correction (e.g., a voltage correction, but effectively a current correction) for a second interval (e.g., a predetermined interval, such as correction interval 507 or 807) after the deactivation time. For certain aspects, the process 1000 further includes storing the correction in a shunt capacitor (e.g., capacitor 405) coupled between the input of the buffer and the reference node for the buck converter. This storage may occur when the first switch opens. For certain aspects, after the second interval ends and while the high-side transistor is deactivated, the process 1000 further entails opening the third switch and closing the fourth switch to couple the input of the low-pass filter to the reference node. For certain aspects, a fifth switch (e.g., switch S5) is coupled between an output of a second amplifier (e.g., a current-sensing amplifier, such as LS Isense 702) and the input of the buffer. The fifth switch may be configured to be open while at least one of the first switch or the second switch is closed. For certain aspects, a sixth switch (e.g., switch S6) is coupled between the first switch and the input of the buffer. The sixth switch may be configured to be open while the first switch is closed. For certain aspects, the process 1000 further involves closing the sixth switch after the first interval ends and while the high-side transistor is activated. In this case, the second switch may be open during the first interval, and closing the second switch may entail closing the second switch after the first interval ends. For certain aspects, the process 1000 further includes activating the low-side transistor after the deactivation time, sensing a low-side current with the second amplifier while the low-side transistor is activated, opening the sixth switch, and closing the fifth switch while the low-side transistor is activated.

According to certain aspects, the low-pass filter includes an integrator (e.g., integrator 602). The integrator may be implemented with a second amplifier (e.g., error amplifier 604).

According to certain aspects, the second switch is closed during the first interval.

Figure 11:
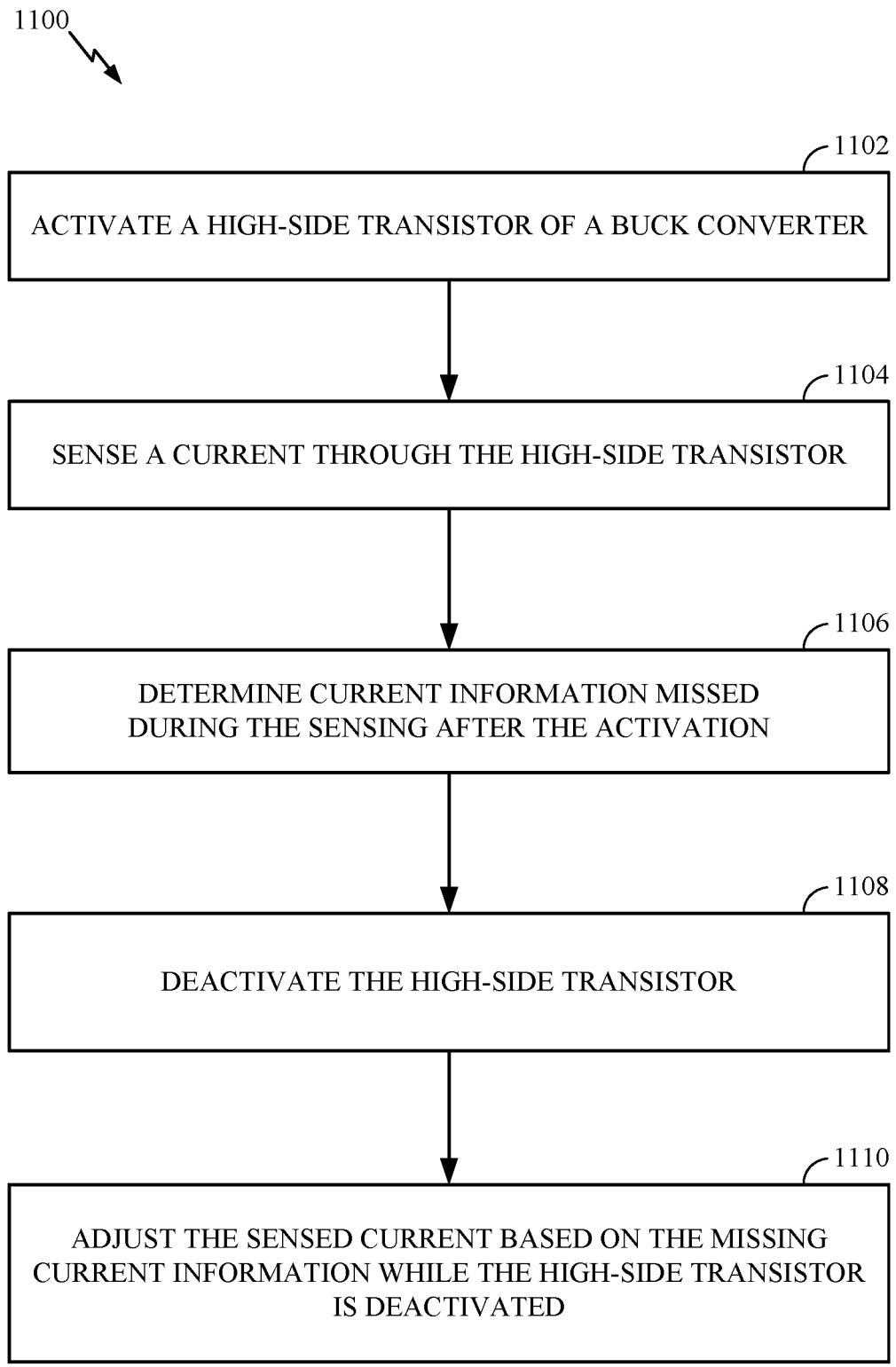

FIG. 11 is a flow diagram of an example process 1100 for current sensing and correction in a buck converter, in accordance with certain aspects of the present disclosure. Additional, fewer, or different operations may be performed, depending on the implementation of the process 1100. The process 1100 may be implemented by a system, such as circuit 400 of FIGS. 4A-4D, circuit 600 of FIG. 6, or circuit 700 of FIG. 7, where it is understood that the buck converter comprises a high-side transistor (e.g., HSFET 401) coupled to a low-side transistor (e.g., LSFET 403). The system may also include a controller for controlling the states of the various transistors and switches therein.

The process 1100 may begin, at operation 1102, with the system activating the high-side transistor (e.g., at an activation time, such as time 502 or 802 for the HSFET 401). At operation 1104, the system senses a current through the high-side transistor while activated. At operation 1106, the system determines current information missed during the sensing after the activation. At operation 1108, the system deactivates the high-side transistor (e.g., at a deactivation time, such as time 506 or 806 for the HSFET 401). At operation 1110, the system adjusts (e.g., corrects) the sensed current based on the missing current information while the high-side transistor is deactivated.

According to certain aspects, sensing the current entails using a current-controlled current source (e.g., a current-sensing amplifier, such as HS Isense 402) coupled to the high-side transistor. For certain aspects, the missing current information is due to at least one of a blanking time or a slew-rate-limited time associated with the current-controlled current source.

According to certain aspects, adjusting the sensed current comprises storing a representation of the sensed current at a time after the activation and applying the representation of the sensed current for an interval (e.g., correction interval 507 or 807 for the HSFET 401) after the deactivation.

According to certain aspects, the process 1100 further involves activating the low-side transistor (e.g., at an activation time, such as time 506 or 806 for the LSFET 403); sensing another current through the low-side transistor while activated; determining other current information missed during the sensing of the other current after the activation of the low-side transistor; deactivating the low-side transistor (e.g., at a deactivation time, such as time 502 or 802 for the LSFET 403); and adjusting the other sensed current based on the other missing current information while the low-side transistor is deactivated. The low-side transistor may be activated while the high-side transistor is deactivated, and vice versa.

According to certain aspects, sensing the other current entails using a current-controlled current source (e.g., a current-sensing amplifier, such as LS Isense 702) coupled to the low-side transistor. For certain aspects, the other missing current information is due to at least one of a blanking time or a slew-rate-limited time associated with the current-controlled current source.

According to certain aspects, adjusting the other sensed current comprises storing a representation of the other sensed current at a time after the activation of the low-side transistor and applying the representation of the other sensed current for an interval (e.g., settling interval 503 or 803 for the HSFET 401, but a correction interval for the LSFET 403) after the deactivation.

AN EXAMPLE DEVICE

It should be understood that aspects of the present disclosure may be used in a variety of applications. Although the present disclosure is not limited in this respect, the circuits disclosed herein may be used in many apparatuses such as in the power supply, battery charging circuit, or power management circuit of a communication system, a video codec, audio equipment such as music players and microphones, a television, camera equipment, and test equipment such as an oscilloscope. Communication systems intended to be included within the scope of the present disclosure include, by way of example only, cellular radio-telephone communication systems, satellite communication systems, two-way radio communication systems, one-way pagers, two-way pagers, personal communication systems (PCS), personal digital assistants (PDAs), and the like.

Figure 13:
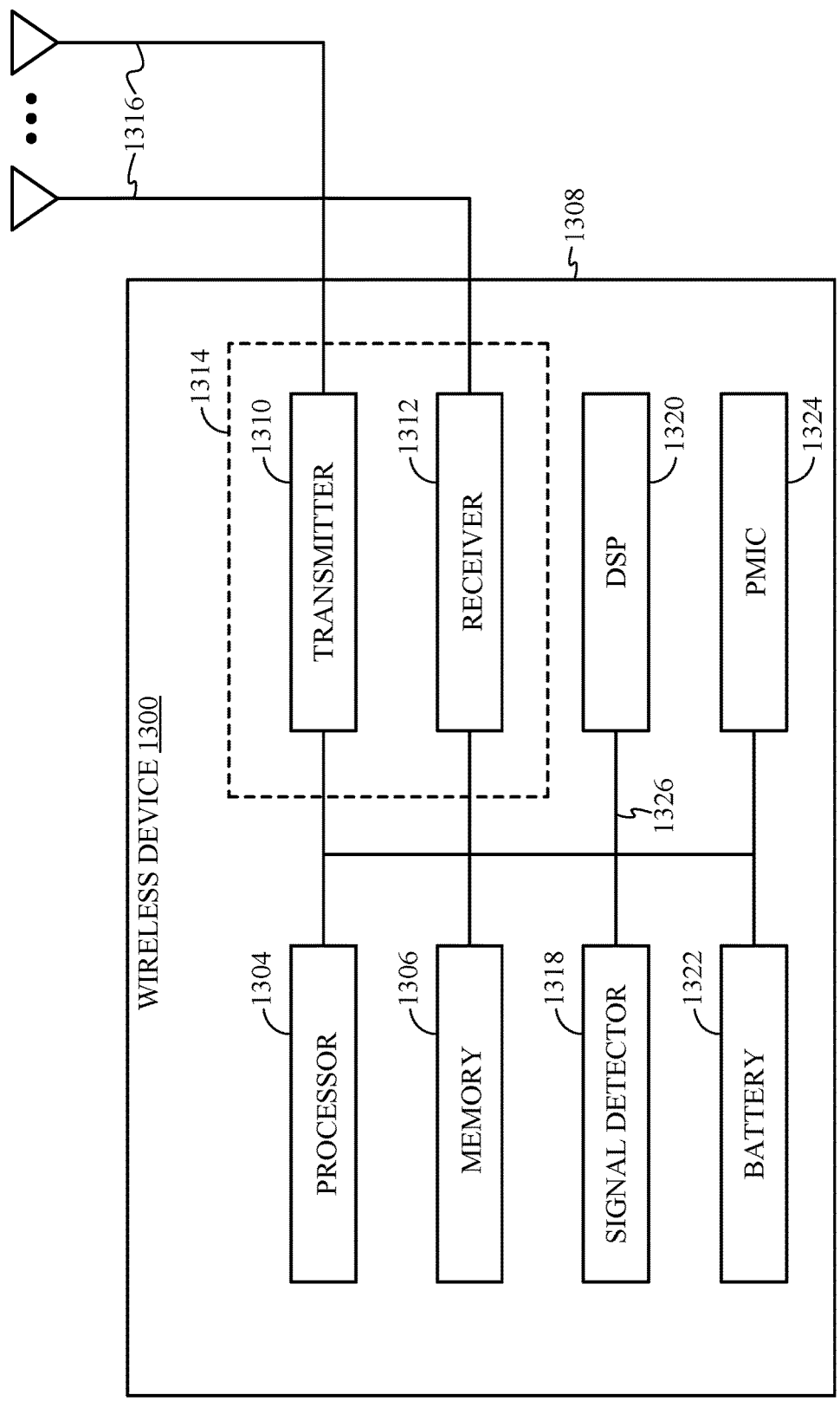
FIG. 13 is a block diagram of an example device that includes a power management integrated circuit (PMIC) that includes and/or controls one or more switching regulators with current-sensing and error-correction circuitry, in accordance with certain aspects of the present disclosure.

FIG. 13 illustrates an example device 1300 in which aspects of the present disclosure may be implemented. The device 1300 may be a battery-operated device such as a cellular phone, a PDA, a handheld device, a wireless device, a laptop computer, a tablet, a smartphone, etc.

The device 1300 may include a processor 1304 that controls operation of the device 1300. The processor 1304 may also be referred to as a central processing unit (CPU). Memory 1306, which may include both read-only memory (ROM) and random access memory (RAM), provides instructions and data to the processor 1304. A portion of the memory 1306 may also include non-volatile random access memory (NVRAM). The processor 1304 typically performs logical and arithmetic operations based on program instructions stored within the memory 1306.

In certain aspects, the device 1300 may also include a housing 1308 that may include a transmitter 1310 and a receiver 1312 to allow transmission and reception of data between the device 1300 and a remote location. For certain aspects, the transmitter 1310 and receiver 1312 may be combined into a transceiver 1314. One or more antennas 1316 may be attached or otherwise coupled to the housing 1308 and electrically connected to the transceiver 1314. The device 1300 may also include (not shown) multiple transmitters, multiple receivers, and/or multiple transceivers.

The device 1300 may also include a signal detector 1318 that may be used in an effort to detect and quantify the level of signals received by the transceiver 1314. The signal detector 1318 may detect such signal parameters as total energy, energy per subcarrier per symbol, and power spectral density, among others. The device 1300 may also include a digital signal processor (DSP) 1320 for use in processing signals.

The device 1300 may further include a battery 1322 used to power the various components of the device 1300. The device 1300 may also include a power management integrated circuit (power management IC or PMIC) 1324 for managing the power from the battery to the various components of the device 1300. The PMIC 1324 may perform a variety of functions for the device such as DC-to-DC conversion, battery charging, power-source selection, voltage scaling, power sequencing, etc. In certain aspects, the PMIC 1324 may include and/or control one or more switching regulators with current sensing and error-correction circuitry, as described above. The various components of the device 1300 may be coupled together by a bus system 1326, which may include a power bus, a control signal bus, and/or a status signal bus in addition to a data bus.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

The various aspects illustrated and described herein are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect.

The foregoing method descriptions and the process flow diagrams are provided merely as illustrative examples and are not intended to require or imply that the steps or actions of various aspects must be performed in the order presented. As will be appreciated by one having ordinary skill in the art, the method steps and/or actions may be interchanged with one another without departing from the scope of the claims. Words such as "thereafter," "then," "next," etc. in the description are not intended to limit the order of the steps or actions; these words are simply used to guide the reader through the description of the methods. In other words, unless a specific order of steps or actions is specified, the order and/or use of specific steps and/or actions may be modified without departing from the scope of the claims. Further, any reference to claim elements in the singular, for example, using the articles "a," "an," or "the" is not to be construed as limiting the element to the singular.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, the term "coupled" may encompass both direct and indirect coupling. Thus, first and second parts are said to be coupled together when directly contacting one another, as well as when the first part couples to an intermediate part, which couples either directly or via one or more additional intermediate parts to the second part.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal, supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The preceding description of the various aspects of the present disclosure is provided to enable any person skilled in the art to implement the disclosed aspects. Various modifications to these aspects will be readily apparent to those skilled in the art, and the generic principles defined herein may be applied to some aspects without departing from the spirit or scope of the disclosure. Thus, the present disclosure is not intended to be limited to the aspects shown herein, but is to be accorded the widest scope consistent with the following claims and the principles and novel features disclosed herein.

What is claimed is:

1. A circuit for current sensing and correction in a buck converter, comprising:
   a first amplifier;
   a buffer;
   a low-pass filter;
   a first switch coupled between an output of the first amplifier and an input of the buffer;
   a second switch coupled between the output of the first amplifier and an input of the low-pass filter;
   a third switch coupled between an output of the buffer and the input of the low-pass filter; and
   a fourth switch coupled between the input of the low-pass filter and a reference node for the circuit.

2. The circuit of claim 1, further comprising a shunt capacitor coupled between the input of the buffer and the reference node for the circuit.

3. The circuit of claim 1, further comprising a shunt resistor coupled between an output of the first amplifier and the reference node for the circuit.

4. The circuit of claim 1, wherein the low-pass filter comprises:
   a resistor having a first terminal being the input of the low-pass filter and a second terminal being an output of the low-pass filter; and
   a capacitor having a first terminal coupled to the second terminal of the resistor and a second terminal coupled to the reference node for the circuit.

5. The circuit of claim 1, wherein the low-pass filter comprises an integrator implemented with a second amplifier.

6. The circuit of claim 1, further comprising:
   a second amplifier;
   a fifth switch coupled between an output of the second amplifier and the input of the buffer; and
   a sixth switch coupled between the first switch and the input of the buffer.

7. The circuit of claim 6, further comprising at least one of:
   a shunt capacitor coupled between the input of the buffer and the reference node for the circuit; or
   a shunt resistor coupled between an output of the second amplifier and the reference node for the circuit.

8. The circuit of claim 6, wherein the buck converter comprises a high-side transistor and a low-side transistor and wherein the second amplifier is configured to sense a current while the low-side transistor is active.

9. The circuit of claim 8, wherein the first switch is configured to be closed and the second, third, fourth, fifth, and sixth switches are configured to be open during a first interval associated with the high-side transistor, after a time when the high-side transistor is activated.

10. The circuit of claim 9, wherein the second switch and the sixth switch are configured to be closed and the first switch, the third switch, the fourth switch, and the fifth switch are configured to be open after the first interval ends and while the high-side transistor is activated.

11. The circuit of claim 8, wherein the third switch and the sixth switch are configured to be closed and the first switch, the second switch, the fourth switch, and the fifth switch are configured to be open for the buffer to apply a correction for a second interval, after a time when the high-side transistor is deactivated.

12. The circuit of claim 11, wherein the fourth switch and the fifth switch are configured to be closed and the first switch, the second switch, the third switch, and the sixth switch are configured to be open after the second interval ends and while the high-side transistor is deactivated.

13. The circuit of claim 1, wherein the buck converter comprises a high-side transistor and a low-side transistor and wherein the first amplifier is configured to sense a current while the high-side transistor is active.

14. The circuit of claim 13, wherein the first switch and the second switch are configured to be closed and the third switch and the fourth switch are configured to be open during a settling time associated with the high-side transistor, after a time when the high-side transistor is activated.

15. The circuit of claim 14, wherein the second switch is configured to be closed and the first switch, the third switch, and the fourth switch are configured to be open after the settling time associated with the high-side transistor while the high-side transistor is activated.

16. The circuit of claim 13, wherein the third switch is configured to be closed and the first switch, the second switch, and the fourth switch are configured to be open for the buffer to apply a correction for a second interval, after a time when the high-side transistor is deactivated.

17. The circuit of claim 16, wherein the fourth switch is configured to be closed and the first switch, the second switch, and the third switch are configured to be open after the second interval ends and while the high-side transistor is deactivated.

18. A method for current sensing and correction in a buck converter comprising a high-side transistor coupled to a low-side transistor, the method comprising:
    activating the high-side transistor at an activation time;
    sensing a high-side current with a first amplifier while the high-side transistor is activated;
    closing a first switch coupled between an output of the first amplifier and an input of a buffer, during a first interval associated with the high-side transistor after the activation time; and
    closing a second switch coupled between the output of the first amplifier and an input of a low-pass filter, after the activation time, a third switch coupled between an output of the buffer and the input of the low-pass filter being configured to be open while the high-side transistor is activated.

19. The method of claim 18, further comprising determining an average input current for the buck converter based on a voltage at an output of the low-pass filter, wherein the voltage is proportional to the current.

20. The method of claim 18, wherein a fourth switch, coupled between the input of the low-pass filter and a reference node for the buck converter, is configured to be open while the second switch is closed.

21. The method of claim 20, further comprising opening the first switch after the first interval ends and while the high-side transistor is activated.

22. The method of claim 21, further comprising:
    deactivating the high-side transistor at a deactivation time;
    opening the second switch after the deactivation time; and
    closing the third switch for the buffer to apply a correction for a second interval after the deactivation time.

23. The method of claim 22, further comprising storing the correction in a shunt capacitor coupled between the input of the buffer and the reference node for the buck converter when the first switch opens.

24. The method of claim 22, further comprising, after the second interval ends and while the high-side transistor is deactivated:
    opening the third switch; and
    closing the fourth switch to couple the input of the low-pass filter to the reference node.

25. The method of claim 24, wherein:
    a fifth switch, coupled between an output of a second amplifier and the input of the buffer, is configured to be open while at least one of the first switch or the second switch is closed; and
    a sixth switch, coupled between the first switch and the input of the buffer, is configured to be open while the first switch is closed.

26. The method of claim 25, further comprising closing the sixth switch after the first interval ends and while the high-side transistor is activated, wherein the second switch is open during the first interval and wherein closing the second switch comprises closing the second switch after the first interval ends.

27. The method of claim 26, further comprising:
    activating the low-side transistor after the deactivation time;
    sensing a low-side current with the second amplifier while the low-side transistor is activated;
    opening the sixth switch; and
    closing the fifth switch while the low-side transistor is activated.

28. The method of claim 18, wherein the second switch is closed during the first interval.

29. A method for current sensing and correction in a buck converter comprising a high-side transistor coupled to a low-side transistor, the method comprising:
    activating the high-side transistor;
    sensing a current through high-side transistor while activated;
    determining current information missed during the sensing after the activation;
    deactivating the high-side transistor; and
    adjusting the sensed current based on the missing current information while the high-side transistor is deactivated.

30. The method of claim 29, further comprising:
    activating the low-side transistor;
    sensing another current through the low-side transistor while activated;
    determining other current information missed during the sensing of the other current after the activation of the low-side transistor;
    deactivating the low-side transistor; and
    adjusting the other sensed current based on the other missing current information while the low-side transistor is deactivated.

* * * * *